US011175222B2

(12) United States Patent
Cunningham et al.

(10) Patent No.: US 11,175,222 B2
(45) Date of Patent: Nov. 16, 2021

(54) INTEGRATED SPECTROSCOPIC ANALYSIS SYSTEM WITH LOW VERTICAL HEIGHT FOR MEASURING LIQUID OR SOLID ASSAYS

(71) Applicant: The Board of Trustees of the University of Illinois, Urbana, IL (US)

(72) Inventors: Brian T. Cunningham, Champaign, IL (US); John Michael Dallesasse, Geneva, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 16/191,732

(22) Filed: Nov. 15, 2018

(65) Prior Publication Data

US 2019/0145889 A1    May 16, 2019

Related U.S. Application Data

(60) Provisional application No. 62/586,241, filed on Nov. 15, 2017.

(51) Int. Cl.
*G01N 21/27* (2006.01)
*G01N 21/25* (2006.01)
(Continued)

(52) U.S. Cl.
CPC .......... *G01N 21/255* (2013.01); *B01L 3/5027* (2013.01); *B01L 3/5085* (2013.01);
(Continued)

(58) Field of Classification Search
CPC .. G01N 21/255; G01N 21/251; B01L 3/5027; B01L 3/5085; B01L 2300/0609; G01J 3/46; G01J 3/02
See application file for complete search history.

(56) References Cited

U.S. PATENT DOCUMENTS

| 4,847,734 A | * | 7/1989 | Katoh | G02B 6/4249 |
| | | | | 362/555 |
| 5,489,980 A | * | 2/1996 | Anthony | G01J 3/06 |
| | | | | 356/308 |

(Continued)

OTHER PUBLICATIONS

Giuseppe Di Caprio,"Hyperspectral Microscopy of Flowing Cells", Imaging and Applied Optics, 2013 (Year: 2013).*

(Continued)

*Primary Examiner* — Maurice C Smith
(74) *Attorney, Agent, or Firm* — McDonnell Boehnen Hulbert & Berghoff LLP

(57) ABSTRACT

The present disclosure describes the design, fabrication, and demonstration of a compact spectroscopic analysis system that utilizes a linear variable filter chip attached directly over an image sensor array, and an integrated broadband LED illuminator that supplies light from the edge of the system to provide a low vertical dimension. The instrument is capable of accurately measuring the optical absorption spectra of colored liquids or the scattered spectra from solid objects that are placed in the illumination pathway. Due to the small vertical thickness of the system, the low cost of its components, and the accuracy with which it renders spectra in comparison to conventional spectrometers, we envision potential incorporation of the system into mobile communication devices, such as smartphones and tablets, as a means for providing a dedicated sensor for health diagnostic, environmental monitoring, and general-purpose color sensing applications.

19 Claims, 19 Drawing Sheets

(51) Int. Cl.
  *B01L 3/00* (2006.01)
  *H04M 1/02* (2006.01)
  *G01J 3/46* (2006.01)
(52) U.S. Cl.
  CPC ............... *G01J 3/46* (2013.01); *G01N 21/27* (2013.01); *H04M 1/0264* (2013.01); *B01L 2200/025* (2013.01); *B01L 2300/06* (2013.01); *B01L 2300/0609* (2013.01); *B01L 2300/0829* (2013.01); *B01L 2300/0877* (2013.01); *G01N 2201/0221* (2013.01); *G01N 2201/062* (2013.01); *G01N 2201/0627* (2013.01); *G01N 2201/0636* (2013.01)

(56) References Cited

U.S. PATENT DOCUMENTS

| | | | | |
|---|---|---|---|---|
| 5,745,176 | A * | 4/1998 | Lebens | G01N 21/8806 235/462.42 |
| 6,424,416 | B1 * | 7/2002 | Gross | G01J 3/02 356/326 |
| 6,844,930 | B2 | 1/2005 | Kobayashi et al. | |
| 8,203,769 | B2 | 6/2012 | Herloski et al. | |
| 8,804,114 | B2 * | 8/2014 | Ingber | B01L 3/508 356/246 |
| 2002/0141050 | A1 * | 10/2002 | Tafas | G01N 21/6458 359/385 |
| 2006/0164833 | A1 * | 7/2006 | Parkyn | G09F 13/02 362/235 |
| 2007/0058921 | A1 * | 3/2007 | Lundgren | G01J 3/02 385/147 |
| 2008/0151249 | A1 * | 6/2008 | Walker | G01N 21/0303 356/445 |
| 2008/0259318 | A1 * | 10/2008 | Pan | G01J 3/02 356/73 |
| 2009/0103088 | A1 * | 4/2009 | Delmas | G02B 27/0025 356/328 |
| 2010/0110442 | A1 * | 5/2010 | Adibi | G01J 3/02 356/454 |
| 2010/0328667 | A1 * | 12/2010 | Wegmuller | G01J 3/02 356/402 |
| 2011/0047867 | A1 * | 3/2011 | Holland | G01J 3/36 47/1.5 |
| 2013/0093936 | A1 * | 4/2013 | Scheeline | G01J 3/42 348/345 |
| 2013/0228710 | A1 | 9/2013 | Pfeifer et al. | |
| 2014/0131578 | A1 * | 5/2014 | Hruska | G01N 21/359 250/339.02 |

OTHER PUBLICATIONS

John A. Carlson et al., "Integration of linear variable filters on CMOS for compact emission and absorption sensing," Proceedings of 15th IEEE Sensors Conference, Sensors 2016 (Oct. 30, 2016).

Yuhang Wan et al., "Compact characterization of liquid absorption and emission spectra using linear variable filters integrated with a CMOS imaging camera," Scientific Reports, 6:29117 (Jul. 8, 2016).

Yuhang Wan et al., "Characterization of liquid absorption and emission spectra using linear variable filters integrated with a CMOS camera," 2016 Conference on Lasers and Electro-Optics (CLEO), Jun. 2016.

Arvin Emadi et al., "Design and implementation of a sub-nm resolution microspectrometer based on a Linear-Variable Optical Filter," Optics Express, 20:489 (2012).

Oliver Schmidt et al., "Performance of chip-size wavelength detectors," Optics Express, 15:9701 (2007).

Xinyang Yu et al., "Development of a Handheld Spectrometer Based on a Linear Variable Filter and a Complementary Metal-Oxide-Semiconductor Detector for Measuring the Internal Quality of Fruit," J. Near Infrared Spectroscopy, 24:69 (2016).

Trey Turner et al., "For Compactness and Ruggedness, Linear Variable Filters Fit the Bill," Photonics Spectra (Sep. 2016).

* cited by examiner

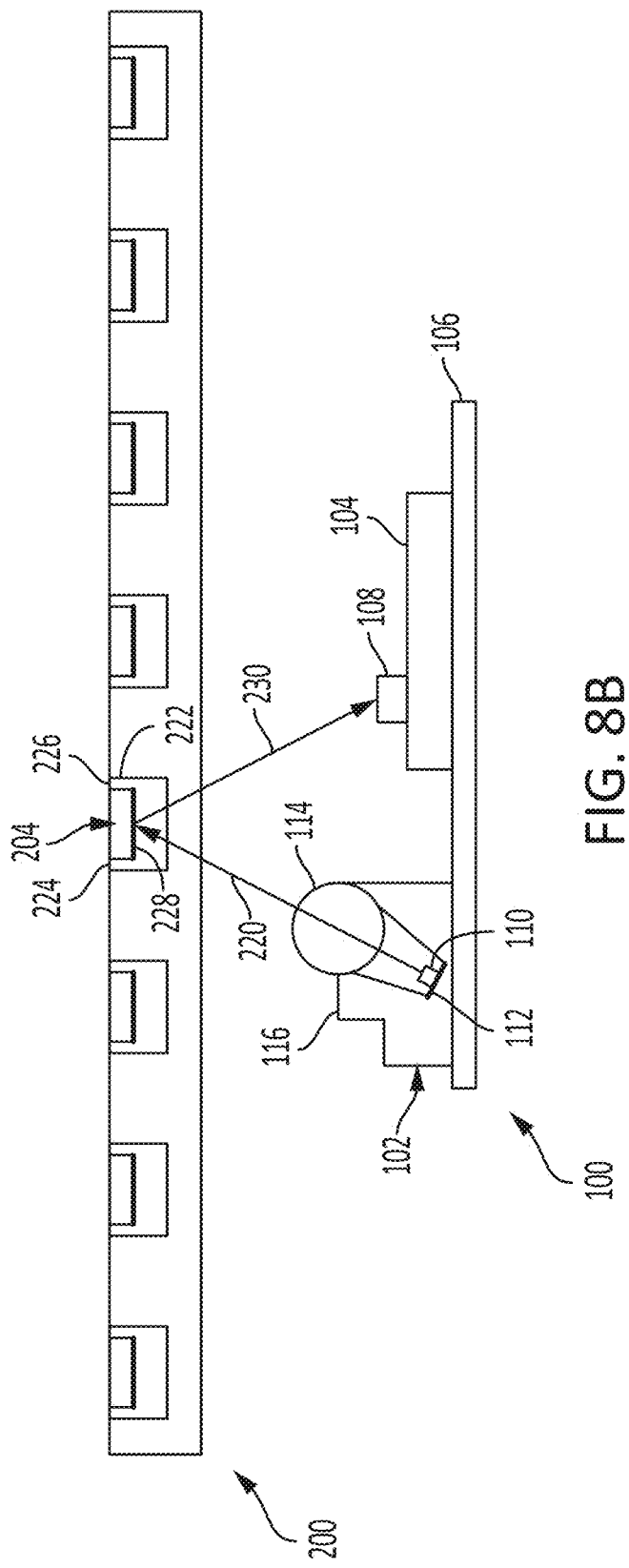

INTEGRATED SPECTROSCOPIC ANALYSIS SYSTEM WITH LOW VERTICAL HEIGHT FOR MEASURING LIQUID OR SOLID ASSAYS

CROSS-REFERENCE TO RELATED APPLICATIONS

This application claims priority under 35 U.S.C. § 119(e) to U.S. Provisional Application No. 62/586,241, filed Nov. 15, 2017, the content of which is incorporated herein by reference.

STATEMENT REGARDING FEDERALLY SPONSORED RESEARCH OR DEVELOPMENT

This invention was made with government support under 1447893 awarded by the National Science Foundation. The government has certain rights in the invention.

BACKGROUND

The detection and quantification of changes in the color of liquids or the color of solid-phase test strips plays an important role across a broad range of analyses, such as medical diagnostics, food and water testing, and environmental monitoring. Colorimetric analysis is a commonly used strategy for sensing the presence and/or quantity of a target substance with the aid of reagents that generate a change in the absorption or scattering spectrum of a liquid or solid media. Examples include dyes, chromophores, quantum dot emitters, and nanoparticle aggregates. In each case, readout of the assay is performed by illuminating the test media (a volume of liquid, or a solid surface) with incoherent light from a broad band of wavelengths, and sensing a change in the absorption spectrum or the reflected/scattered spectrum that occurs due to the presence of an analyte. One of the most highly utilized tests of this type is the Enzyme-Linked Immunosorbent Assay (ELISA) that utilizes changes in the absorption spectrum of a liquid-phase sample, due to an enzyme-catalyzed reaction with a chromogenic substrate. While pH test strips are the most familiar example of a solid phase colorimetric assay, color-changing test strips have been developed for analytes that include glucose, heavy metals, and bacteria, in which a major benefit is the ability to perform a simple test protocol that is suitable for point-of-use applications.

Many approaches have been utilized for detection of color change. The simplest approach, visual inspection, where the test sample is compared against a set of standard color pads, is convenient but not quantitatively accurate. Another simple alternative, nonspectral image analysis, involves taking an image of the test sample with a digital camera, in which the red-green-blue (RGB) pixels of the image can be assigned a numerical value that represents the observed color. While this approach is semi-quantitative, the nonlinearity of RGB-wavelength mapping, and the nonuniformity of built-in RGB filters prevents simple quantitative determination of the absorption/scattered spectrum at any specific wavelength. For situations in which only a single chromophore is expected, it can be sufficient to measure the absorption or scattering spectrum from only one wavelength using a colorimeter comprised of a broadband illuminator and a detector placed behind an optical passband filter. For example, microtiter plate readers configured specifically to perform readout of ELISA tests, incorporate filters that enable measurement of the most common chromophores.

The most flexible and quantitatively accurate instruments for colorimetric analysis are based on spectroscopy, which offers a universal capability to sense the absorption or scattering of many chromophores over a broad spectral range. Conventional spectrometers utilize an optical component such as a diffraction grating or a prism that provides dispersion which allows the wavelength components of a collimated light beam to be spatially separated, so that a sensor array can record the relative intensities across a spectrum. The wavelength resolution of such a system is determined (in part) by the length of the optical path between the dispersive element and the sensor array, as greater propagation distance results in greater spatial separation of distinct wavelengths. Compact spectrometer configurations based upon this approach are commercially available that achieve path lengths of ~10 mm (Hamamatsu, C12666MA, Hamamatsu City, Shizuoka Pref., Japan, with 15 nm wavelength resolution) to several centimeters (Ocean Optics, HR2000+, Dunedin, Fla., USA, with ~0.03 to 7 nm wavelength resolution, depending on wavelength range), and it has been demonstrated that a diffraction grating placed directly in front of a smartphone camera sensor performs as a spectrometer with around 1-3 mm path length with a 0.334 nm wavelength resolution. Nonetheless, in conventional spectrometer designs, a number of factors contribute to the size of the instrument, including the optical path length that provides for the wavelength dispersion, external light source(s), collimation optics, and focusing optics.

SUMMARY

In one aspect, example embodiments provide a system comprising a light source, a linear variable filter (LVF), an image sensor optically coupled to the LVF, and a sample holder comprising a planar surface. The planar surface defines a surface normal that extends perpendicularly from the planar surface and goes through a point between the light source and the LVF. The light source is arranged to direct incident light toward the planar surface such that the incident light is at a first acute angle relative to the surface normal. The LVF is arranged to (i) receive analysis light that comprises light propagating from the planar surface at a second acute angle relative to the surface normal and (ii) filter the received analysis light such that different wavelength components of the received analysis light are transmitted toward different portions of the image sensor.

In some of the system embodiments, the analysis light comprises incident light from the light source that has specularly reflected from the planar surface, such that the second acute angle is equal to the first acute angle. Thus, the planar surface could include a mirror. In such embodiments, the sample holder may include a sample compartment that contains a liquid sample, and the analysis light may comprise incident light that has interacted with the liquid sample contained in the sample compartment. Spectral analysis of the analysis light may reveal an absorption spectrum of the liquid sample from which one or more characteristics of the liquid sample (e.g., the concentration of an analyte in the sample) may be determined. In a specific configuration, the sample compartment is optically coupled to the mirror such that the incident light from the light source passes through a first portion of the liquid sample contained in the sample compartment, is reflected by the mirror, passes through a second portion of the liquid sample contained in the sample compartment and is received by the LVF as analysis light. In some implementations, the sample holder includes a plurality of sample compartments and a plurality of mirrors, such that each sample compartment is optically coupled to a respective mirror. Further, the sample holder could be moveable relative to the light source and the LVF such that the incident light from the light source can be directed into any of the sample compartments to provide analysis light received by the LVF.

In other of the system embodiments, the analysis light comprises incident light that has scattered from the planar surface. For example, the planar surface may comprise a test area of a test strip, and the analysis light may comprise incident light that has interacted with a sample applied to the test strip. Spectral analysis of the analysis light may be used to determine a color of the test area from which one or more characteristics of the sample (e.g., the concentration of an analyte in the sample) may be determined.

In some of the system embodiments, the light source comprises a plurality of light-emitting diodes (LEDs), such as white light LEDs. In addition, the LEDs may be optically coupled to a cylindrical lens or other optical element that collimates the light emitted by the LEDs.

In some of the system embodiments, the LVF is bonded directly to the image sensor (e.g., by means of a UV-cured adhesive).

In some of the system embodiments, the system includes a plurality of LVFs optically coupled to the image sensor. Each LVF in the plurality of LVFs may filter a different respective range of wavelengths.

In some of the system embodiments, the light source, the LVF, and the image sensor are integrated into a smartphone, a tablet computer, or other mobile communication device.

In another aspect, example embodiments provide a method. The method involves directing incident light from a light source toward a planar surface of a sample holder such that (i) the incident light is at a first acute angle relative to a surface normal of the planar surface and (ii) the incident light interacts with a sample disposed in the sample holder. The method further involves receiving analysis light at a linear variable filter (LVF) that is optically coupled to an image sensor. The analysis light comprises light propagating from the planar surface at a second acute angle relative to the surface normal. The method yet further involves the LVF filtering the received analysis light such that different wavelength components of the received analysis light are transmitted toward different portions of the image sensor. The method may still further involve using the image sensor to capture at least one image, wherein the different wavelength components of the received analysis light are in different pixels of the at least one image.

In some of the method embodiments, the analysis light comprises incident light from the light source that has specularly reflected from the planar surface, such that the second acute angle is equal to the first acute angle. For example, the sample could be a liquid sample contained in a sample compartment of a sample holder, and the planar surface may include a mirror that is optically coupled to the sample compartment. With that configuration, the incident light from the light source may be directed toward the mirror such that the incident light passes through a first portion of the liquid sample contained in the sample compartment, is reflected by the mirror, passes through a second portion of the liquid sample contained in the sample compartment, and is received by the LVF as analysis light.

In other of the method embodiments, the analysis light comprises incident light from the light source that has scattered from the planar surface. For example, the planar surface may comprise a test area of a test strip, with the sample applied to the test area.

BRIEF DESCRIPTION OF THE DRAWINGS

The features, objects and advantages other than those set forth above will become more readily apparent when consideration is given to the detailed description below. Such detailed description makes reference to the following drawings.

FIG. 8B shows a cross-sectional view of the sample cartridge shown in FIG. 8A positioned over the detection instrument shown in FIG. 6B, in accordance with an example embodiment.

Figure 1:
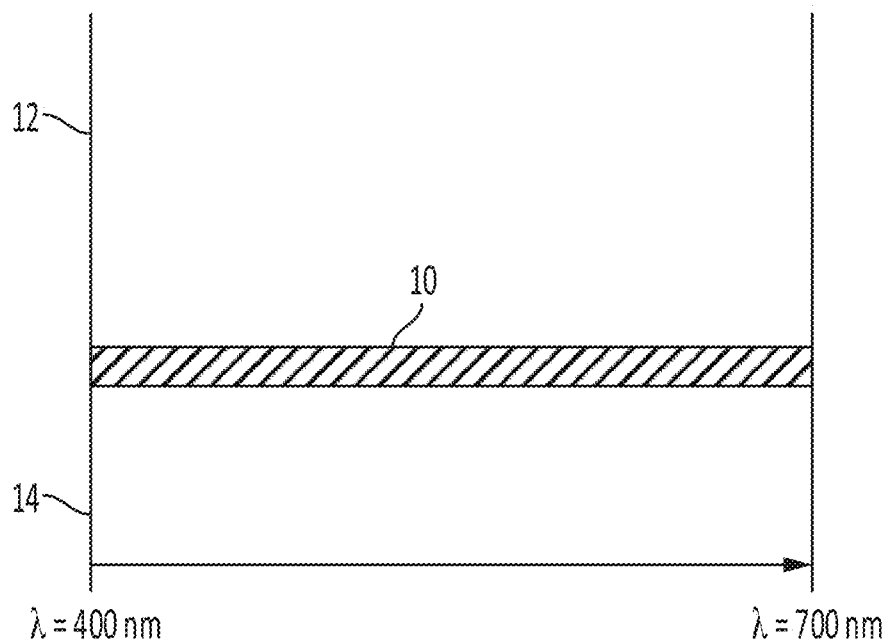
FIG. 1 schematically illustrates a linear variable filter (LVF) filtering an incident light beam to provide a filtered light beam, in accordance with an example embodiment.

While the present invention is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the embodiments above and claims below for interpreting the scope of the invention.

DETAILED DESCRIPTION

The device and methods now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Likewise, many modifications and other embodiments of the device and methods described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

1. Overview

Presented herein are optical systems and methods that can provide a spectroscopic instrument sufficiently compact that it could feasibly be integrated within the body of a smartphone. Example embodiments make use of a linear variable filter (LVF), which is a narrow bandwidth optical transmission filter with a gradient in the transmitted wavelength in one direction. To illustrate, FIG. 1 shows an example LVF 10 with a spectral range of 400 nm to 700 nm, i.e., the wavelength filtering varies linearly along its length from 400 nm at the left side of LVF 10 to 700 nm at the right side of LVF 10. As shown, incident light beam 12, which includes wavelengths from 400 nm to 700 nm (e.g., from a broadband light source), is incident on LVF 10 from the top. LVF 10 filters the incident light beam 12 to provide a filtered light beam 14 that has different wavelengths at different positions. Specifically, moving from the left side of filtered light beam 14 to the right side of filtered light beam 14 (as indicated by the arrow), the wavelengths increase linearly from 400 nm to 700 nm. It is to be understood that the spectral range of 400 nm to 700 nm is exemplary only, as an LVF could have other spectral ranges that are broader (e.g., 400 nm to 800 nm), narrower (e.g., 350 nm to 400 nm), and/or include entirely different wavelengths (e.g., 800 nm to 1500 nm). Commercially available LVFs are typically made up of hundreds of dielectric thin films of alternating refractive index with a thickness gradient across the length of the LVF. However, other ways of implementing LVFs are possible as well.

Figure 2:
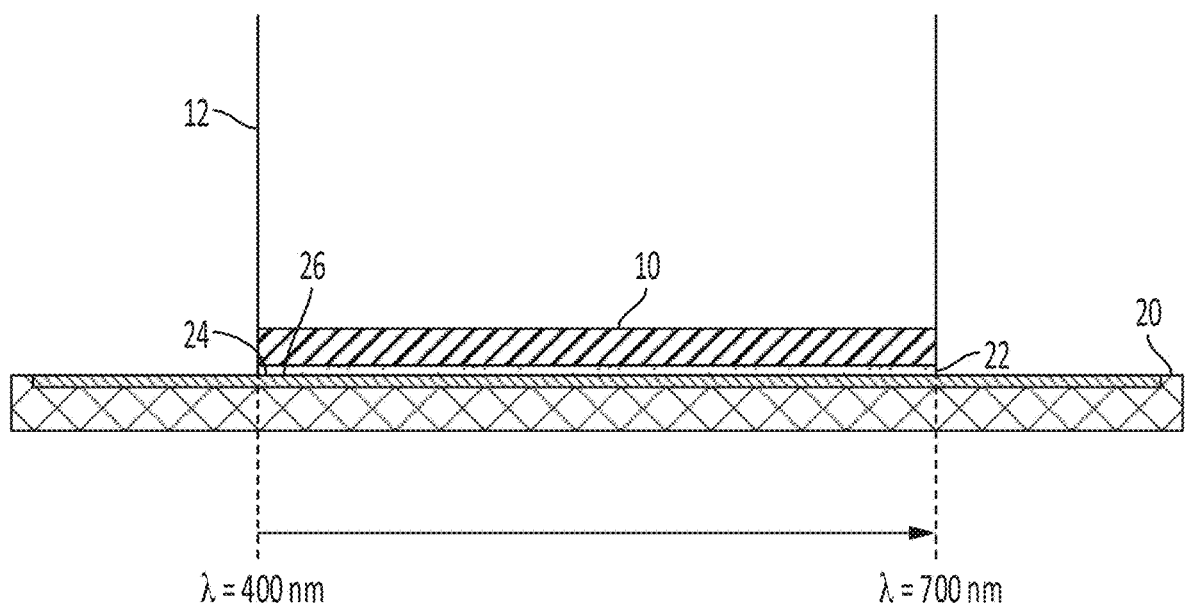
FIG. 2 schematically illustrates an LVF bonded directly to an image sensor via a layer of optically transparent material, in accordance with an example embodiment.

In example embodiments, an LVF is placed directly on top of an image sensor (e.g., a conventional smartphone image sensor) to provide sufficient wavelength resolution for characterizing broad bandwidth spectral features of absorption spectra and emission spectra (e.g., for medical diagnostic assays). FIG. 2 illustrates an example implementation in which the LVF 10 shown in FIG. 1 is bonded directly to a complementary metal-oxide-semiconductor (CMOS) image sensor 20 via a layer of optically transparent material 22 (e.g., a UV-cured adhesive). As in FIG. 1, incident light beam 12 that includes wavelengths from 400 nm to 700 nm is incident on LVF 10 from the top. The LVF 10 filters the incident light so that different light sensitive elements (pixels) of the CMOS image sensor 20 receive different wavelengths, ranging from 400 nm under the left side of LVF 10 to 700 nm under the right side of LVF 10. Typically, each pixel will receive a range of wavelengths, depending on the size of the pixel, its position under the LVF 10, and the pass bandwidth of the LVF 10. For example, if 30 pixels of the CMOS image sensor 20 span the length of the LVF 10, then the pixel at the left (pixel 24) may receive light with wavelengths between 400 nm and 410 nm, the next pixel (pixel 26) may receive light with wavelengths between 410 nm and 420 nm, and so forth.

Although the LVF 10 is bonded directly to the CMOS image sensor 20 in the example implementation shown in FIG. 2, it is to be understood, that the LVF 10 could alternatively be physically separate from, but optically coupled to, the CMOS image sensor 20.

Figure 3:
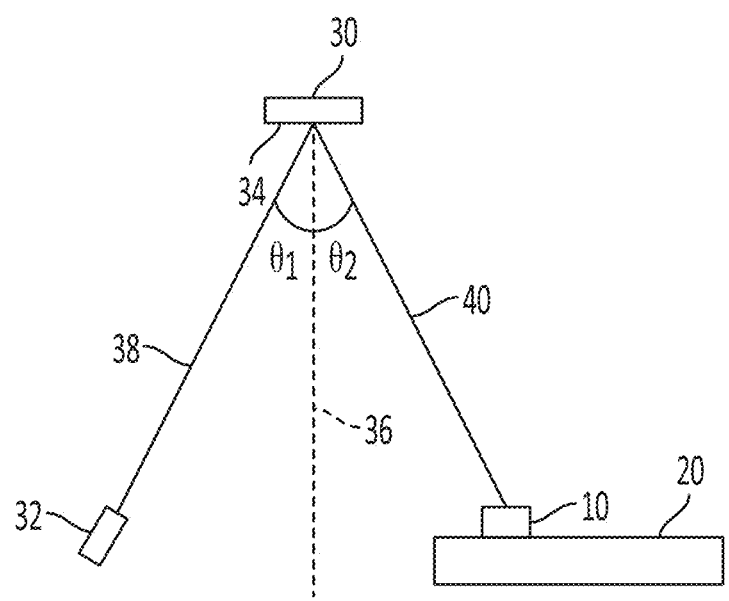
FIG. 3 schematically illustrates a configuration in which a light source directs incident light toward a surface of an object and an LVF bonded to an image sensor receives analysis light propagating from the surface of the object, in accordance with an example embodiment.

The implementation shown in FIG. 2 could be combined with a light source that is arranged to illuminate an object placed between the light source and the LVF such that incident light from the light source is reflected by or scattered from a surface of the object to provide analysis light that is filtered by the LVF for detection by the corresponding pixels of the image sensor. An example configuration is illustrated in FIG. 3. As shown, an object 30 is positioned between a light source 32 and the LVF 10 bonded to the CMOS image sensor 20. Object 30 could be any object for which spectral analysis is desired. As described in more detail below, object 30 could be a sample holder in which a sample is disposed (the sample could be a liquid sample disposed in a sample compartment, or the sample could be a sample that has been applied to a test area of a test strip). Light source 32 could be a broadband light source, such as one or more white light emitting diodes (LEDs). Light source 32 could also include one or more lenses or other optical elements to collimate or structure the emitted light. In this example, object 30 has a surface 34 (e.g., a planar surface) that has a surface normal 36 that extends perpendicularly therefrom and goes through a point between the light source 32 and the LVF 10. The light source 32 is arranged to direct incident light 38 toward the surface 34 such that the incident light 38 is at a first acute angle, $\theta_1$, relative to the surface normal 36. The LVF 10 is arranged to receive analysis light 40 that propagates from the surface 34 at a second acute angle, $\theta_2$, relative to the surface normal 36. In some examples, such as when the incident light 38 is specularly reflected from the surface 34 as the analysis light 40, $\theta_1$ could be equal to $\theta_2$. In other examples, such as when the incident light 38 is diffusely reflected or scattered by the surface 34, $\theta_1$ could be greater than or less than $\theta_2$. In the configuration shown in FIG. 3, the image sensor 20 can be used to capture one or more images of the analysis light 40 filtered by the LVF 10. The pixels in the one or more images can be correlated to different wavelengths to determine a spectrum of the analysis light 40.

Figure 4:
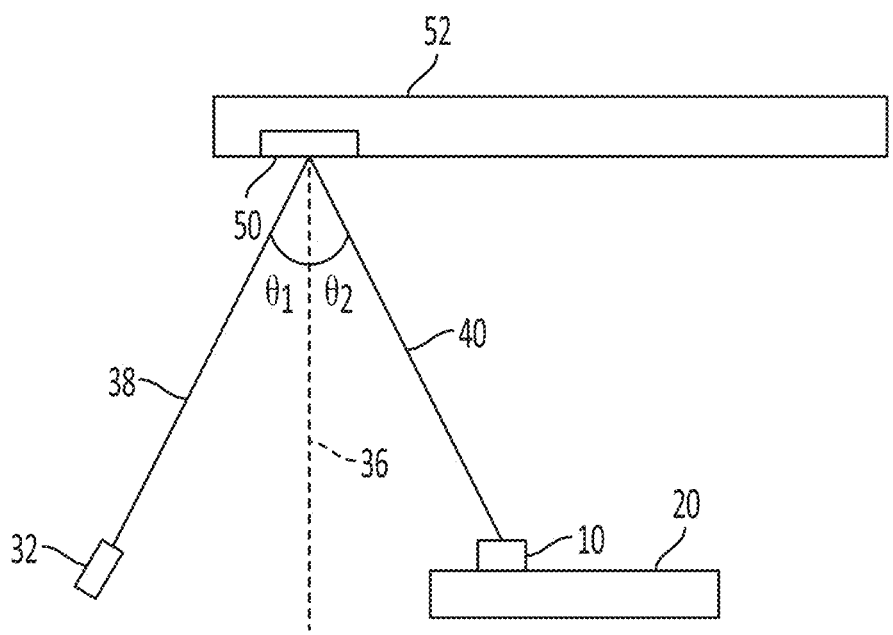
FIG. 4 schematically illustrates a configuration in which a light source directs incident light toward a test area of a test strip and an LVF bonded to an image sensor receives analysis light scattered or diffusely reflected from the test area, in accordance with an example embodiment.
Figure 5A:
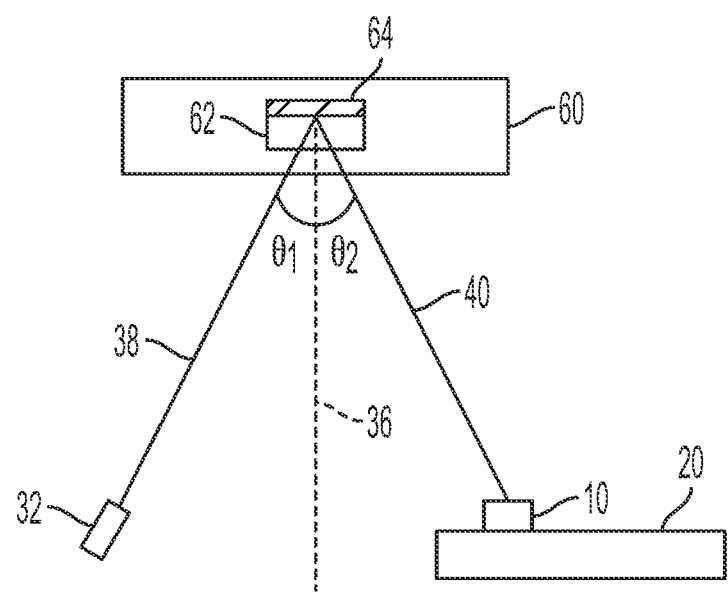
FIG. 5A schematically illustrates a configuration in which a light source directs incident light toward a reflective surface of a sample compartment and an LVF bonded to an image sensor receives analysis light specularly reflected by the reflective surface, in accordance with an example embodiment.

In the configuration shown in FIG. 3, the LVF 10 bonded to the image sensor 20 functions as a spectrometer that can spectrally analyze the analysis light 40 received by the LVF 10. In some implementations, spectral analysis of the analysis light 40 could be used to determine a color of the surface 34 of the object 30. For example, the surface 34 may be a test area of a diagnostic test strip to which a sample has been applied (e.g., as shown in FIG. 4). In that example, the color of the test area that is determined based on spectral analysis of the analysis light 40 may be used to determine a concentration of an analyte in the sample and/or other characteristics of the sample. In some implementations, spectral analysis of the analysis light 40 could be used to determine an absorption spectrum of a liquid sample into which the incident light 38 is directed (e.g., as shown in FIG. 5A). The absorption spectrum could be used to determine a concentration of an analyte in the liquid sample and/or other characteristics of the liquid sample. In general, the spectrum of the analysis light 40 may be the result of interaction of the incident light 38 with a sample through absorption, reflection, scattering, fluorescence, or other mechanism.

FIG. 4 illustrates an example in which a test area 50 of a test strip 52 is positioned between the light source 32 and the LVF 10. The incident light 38 is scattered or diffusely reflected by the test area 50 as analysis light 40. Spectral analysis of the analysis light 40 can be used to determine a color of the test area 50. The color of the test area 50 may, in turn, be used to determine a characteristic of a sample applied to the test area 50 (e.g., a concentration of an analyte in the sample). In some cases, test strip 52 may hold multiple samples, with each sample applied to a respect test area of the test strip 52. In such cases, the test strip 52 could be moved so that each test area is positioned successively between the light source 32 and the LVF 10, and the image sensor 20 could be used to capture one or more images of the analysis light 40 filtered by the LVF 10 at each position.

FIG. 5A illustrates an example in which a sample holder 60 is positioned above the light source 32 and the LVF 10. The sample holder 60 includes a sample compartment 62 that includes a reflective surface 64. The sample compartment 62 can hold a liquid sample. The incident light 38 enters the sample compartment 62 and is specularly reflected by the reflective surface 64 as analysis light 40. The analysis light 40 propagates through the sample compartment 62 to reach the LVF 10. Thus, the light can interact with the liquid sample in the sample compartment 62 both before and after reflection by the reflective surface 64. Because of the specular reflection by reflective surface 64, the incident light 38 and the analysis light 40 are at the same acute angle relative to the surface normal 36 of the reflective surface 64 (i.e., $\theta_1=\theta_2$). Spectral analysis of the analysis light 40 can be used to determine an absorption spectrum of the liquid sample in the sample compartment 62. The absorption spectrum may, in turn, be used to determine a characteristic of the sample (e.g., a concentration of an analyte in the sample). In some cases, sample holder 60 can hold multiple samples in multiple sample compartments. In such cases, the sample holder 60 could be moved so that each sample compartment is positioned successively between the light source 32 and the LVF 10, and the image sensor 20 could be used to capture one or more images of the analysis light 40 filtered by the LVF 10 at each position.

Although in the example illustrated in FIG. 5A, the reflective surface 64 is on the upper surface of the sample compartment 62, it is to be understood that the reflective surface 64 could alternatively be separate from, but optically coupled to, the sample compartment 62.

Figure 5B:
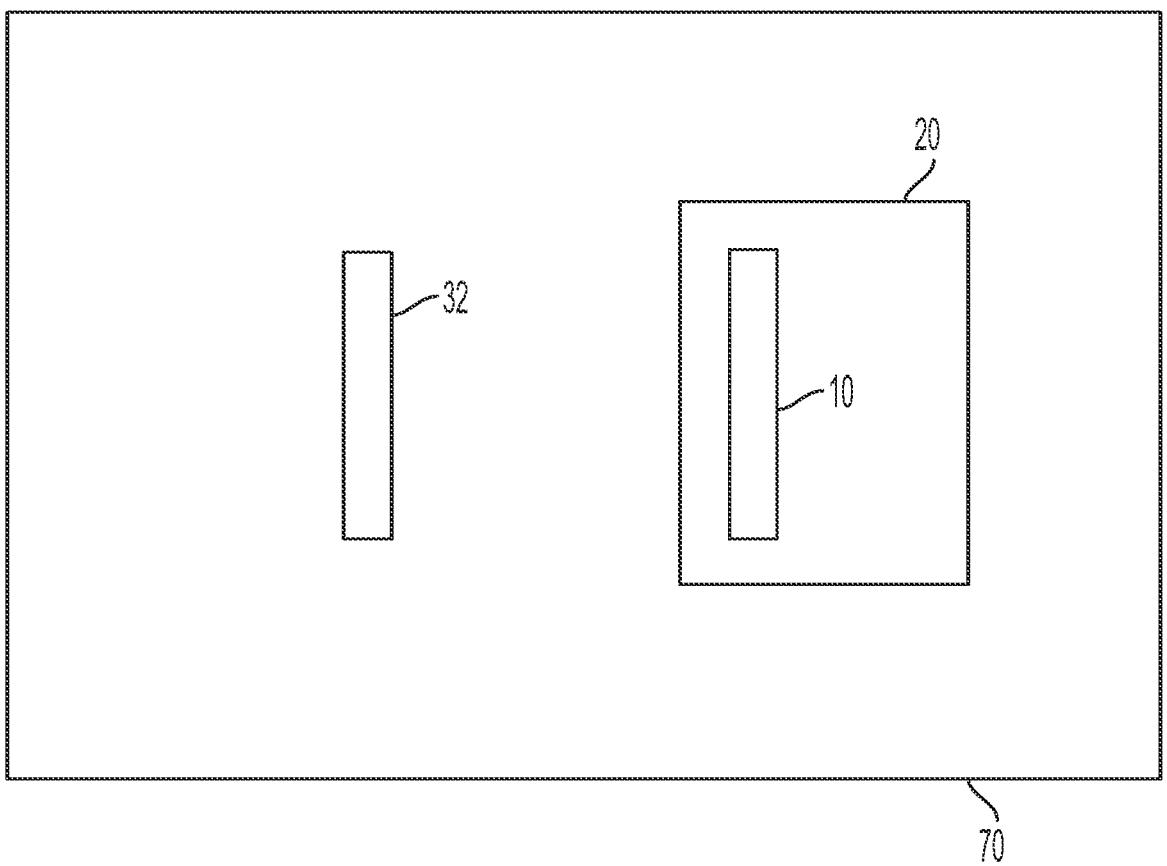
FIG. 5B schematically illustrates the light source and LVF bonded to the image sensor in a smartphone.

The light source 32 and LVF 10 bonded to the CMOS image sensor 20 could be integrated within a smartphone 70 (see FIG. 5B). These elements within the smartphone could beneficially provide the smartphone with a color analysis sensor capable of making quantitative assessments of objects that are placed in front of it. Such a system would not only be able to measure the reflected/scattered spectrum of common solid objects (such as walls, images, cars, clothing, skin) for accurate color matching, but would also enable a host of health, wellness, food safety, and environmental monitoring applications for which existing chemical/biological assays result in a colored liquid or a colored solid test strip. Such a dedicated "science camera" within a smartphone would put convenient, accurate colorimetric analysis within reach of millions of people, and help drive the development of point-of-use testing, enabled by simple-to-use software apps and complete integration with cloud-based data analysis services.

Thus, the present disclosure utilizes photonic integration techniques to provide compact illumination of the object under test. The integration of uniform LED edge illumination with the LVF spectrometer can provide a form factor that is no thicker than a conventional packaged image sensor chip that fits within the body of a conventional smartphone. The low cost and simplicity of the system components are consistent with the components used in consumer electronic devices, while the system functions by simply placing the test object in front of the instrument. The system is capable of measuring the absorption spectra of a variety of colored liquids and the scattering spectra of solid-phase objects like paper and strips. Performance of an ELISA assay has been demonstrated, in which detection of fetal fibronectin (fFN) is selected, a protein whose concentration is used to help determine how likely an expectant mother is to proceed to pre-term labor, as a representative example of a health diagnostic test that would be useful in point-of-care settings where access to clinical laboratory facilities is not available. The compact instrument provides dose-response curves and limits of detection that are equivalent to reading the same assay with a laboratory based ELISA microplate reader.

The present disclosure describes the design, fabrication, and demonstration of a compact spectroscopic analysis system that utilizes a linear variable filter chip attached directly over an image sensor array, and an integrated broadband LED illuminator that supplies light from the edge of the system to provide a low vertical dimension. The instrument is capable of accurately measuring the optical absorption spectra of colored liquids or the scattered spectra from solid objects that are placed in the illumination pathway. Due to the small vertical thickness of the system, the low cost of its components, and the accuracy with which it renders spectra in comparison to conventional spectrometers, it is feasible to incorporate the system into mobile communication devices, such as smartphones and tablets, as a means for providing a dedicated sensor for health diagnostic, environmental monitoring, and general-purpose color sensing applications. As representative examples, the system is demonstrated for quantitatively measuring the liquids of a fetal fibronectin enzyme linked immunosorbent assay (ELISA) and for differentiating the color of pH test strips. A 3D-printed microfluidic cartridge comprised of a linear array of liquid compartments is demonstrated as a simple means for interfacing with the system, and for performing multiple measurements in series that can easily include experimental controls, concentration standards, and replicates.

The spectroscopic analysis approach demonstrated herein combines characteristics of low cost, compact vertical dimension, while integrating the functions of illumination, dispersion, and sensing. LVF-based spectrometry offers the ability to simply attach an optical component over a conventional image sensor array, and to process images gathered from the array as spectra along one linear dimension. In the work reported here, a 2D image sensor array was used, although in principle, equivalent information could be obtained with a linear sensor array, perhaps reducing the cost and size of the system even further.

The image sensor may be utilized effectively in other ways using the basic approach described herein. For example, separate LVF chips designed with a variety of wavelength ranges along the same gradient dimension may be attached side-by-side, to enable the system to simultaneously analyze the same incoming light with desired combinations of wavelength and spectral resolution. For example, one LVF may be utilized that spans a broad band of wavelengths (for example, 400-800 nm) with 5 nm resolution while a second neighboring LVF could analyze a narrow band of wavelengths (for example 350-400 nm) with a 0.5 nm resolution for applications that require acquisition of more detailed spectra features. Likewise, a third LVF may be applied to the same image sensor chip to analyze a band of wavelengths in the 800-1500 nm part of the spectrum. While only white LEDs from one edge of the sensor were used in the work reported here, one may envision integrating LEDs that emit in specific narrow parts of the spectrum through the same rod lens, or deploying an illuminator on the opposite side of the sensor that could generate focused light rather than collimated light. The approach outlined here is extremely flexible in terms of the wavelengths that can be used to illuminate test objects and the wavelength range/resolution that can be selected for the LVFs through which reflected/scattered light is detection.

While an LVF-based spectrometer may not provide the wavelength resolution of grating-based spectrometers, the most commonly encountered fluorescent, absorption, and scattered spectra, such as those demonstrated here, are comprised of broad spectra features that can be discriminated with ~3-4 nm spectral resolution capability. Thus, LVF-based spectrometers are sufficient for a wide variety of consumer and point-of-use tests that involve colored liquids, colored filters, fluorophore emission, quantum dot emission, plasmonic absorption, and many others that have spectral features with full-width-half maxima of 5 nm or greater.

2. Example Detection Instrument

Figure 6A:
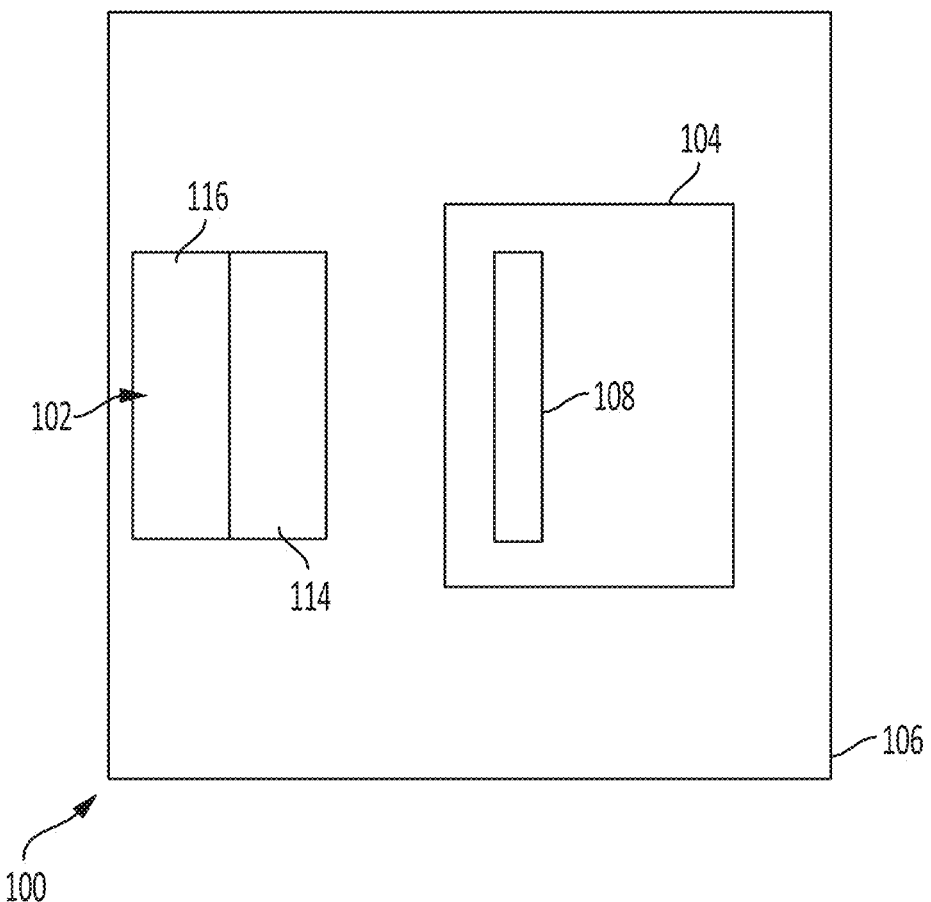
FIG. 6A is a top view of a detection instrument that includes an LVF bonded to a CMOS image sensor, in accordance with an example embodiment.
Figure 6B:
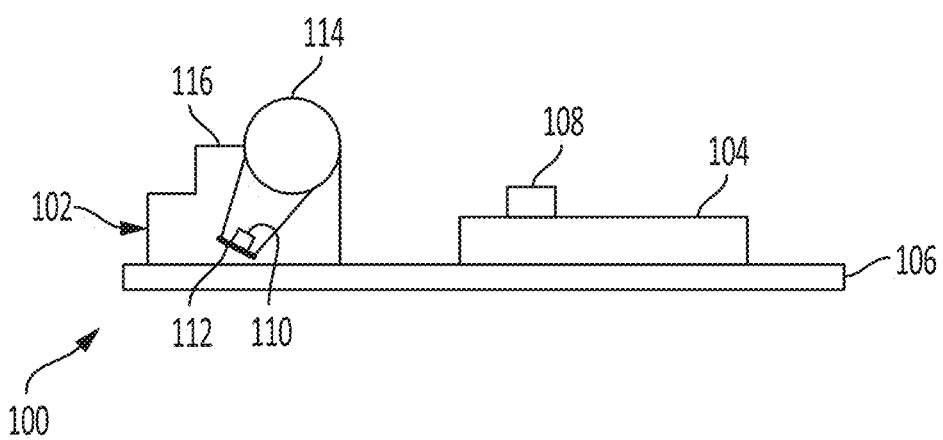
FIG. 6B is a side view of the detection instrument shown in FIG. 6A, in accordance with an example embodiment.

FIGS. 6A and 6B are a top view and a side view, respectively, of a detection instrument 100 that was used to obtain the results reported herein. The detection instrument 100 included an LED-based illumination module 102 (light source) and a CMOS image sensor 104 mounted to a base plate 106 and an LVF 108 mounted on the CMOS image sensor 104.

The LVF 108 (JDS Uniphase Corporation, Milpitas, Calif., USA) had a spectral range of $\lambda$=400-700 nm over a length of 9.5 mm and was attached directly onto the surface of the CMOS image sensor 104 (Framos, GCPM1931, 1936×1216 pixels, each pixel is 5.86×5.86 µm, Taufkirchen, Germany) with UV-cured adhesive to form the LVF spectrometer. The spectral resolution of the LVF spectrometer was measured to be 3.77 nm, representing the smallest wavelength difference between two monochromatic sources that can be differentiated. Because the absorption and scattering spectral features of all the colorimetric assays reported herein are much broader than 3.77 nm, the resolution of the spectrometer itself does not present a fundamental limitation for its ability to measure changes in absorption/scattered spectra.

The illumination module 102 included three LEDs 110 arranged in a row on a printed circuit board (PCB) 112. In the view of FIG. 6B, the row of LEDs 110 goes into the page. The LEDs 110 were white miniTOPLEDs (OSRAM, Munich, Germany) with a broadband emission spectrum extending from 400$\leq\lambda\leq$800 nm and driven with a 20 mA DC current. The light beams emitted from the LEDs 110 were combined in parallel to produce a light beam that was collimated by a cylindrical lens 114 (Edmund Optics, 5.0 mm Diameter×10.0 mm Length, N-BK7 Rod Lens, Barrington, N.J., USA). The mechanical orientation of the LEDs 110 with respect to the cylindrical lens 114 was controlled by a custom-fabricated aluminum fixture 116 to provide an the LED emission axis oriented at a 58 degree angle with respect to the plane of the image sensor 104. The cylindrical lens 114 was placed along the central axis of the LED emission, at a distance of 3.46 mm from the surfaces of the LEDs 110. The LEDs 110 were arranged in a line parallel to the long axis of the cylindrical lens 114 by surface mounting to the PCB 112 with electrical connections that enabled each of the LEDs 110 to receive the same excitation voltage in parallel.

ZEMAX ray tracing software was used to design the geometry of the optical setup, using published models for the angular output distribution of the LEDs 110 and the specifications for the cylindrical lens 114. The modeling considered the source wavelength spectrum to create a dynamic free-space arrangement of system components. Information regarding the lens parameters, reflectivities, source intensities, sample interactions, and beam sizing relative to the LVF 108 were considered and incorporated into the analysis. The simulation output of the intensity distribution from the illuminating sources at the reflection plane (provided by the sample cartridge shown in FIGS. 8A and 8B) showed that the three discrete LEDs each with a viewing angle of 70 degrees together combine to form a collimated and uniform beam suitable for use with the LVF 108. The system was designed such that light from the LED-based illumination module 102 reaching a plane (the reflection plane provided by the sample cartridge) located 14.3 mm above the image sensor 104 at an angle of 32 degrees (relative to the surface normal of the reflection plane) will be reflected onto the LVF 108 at the same angle.

Figure 7A:
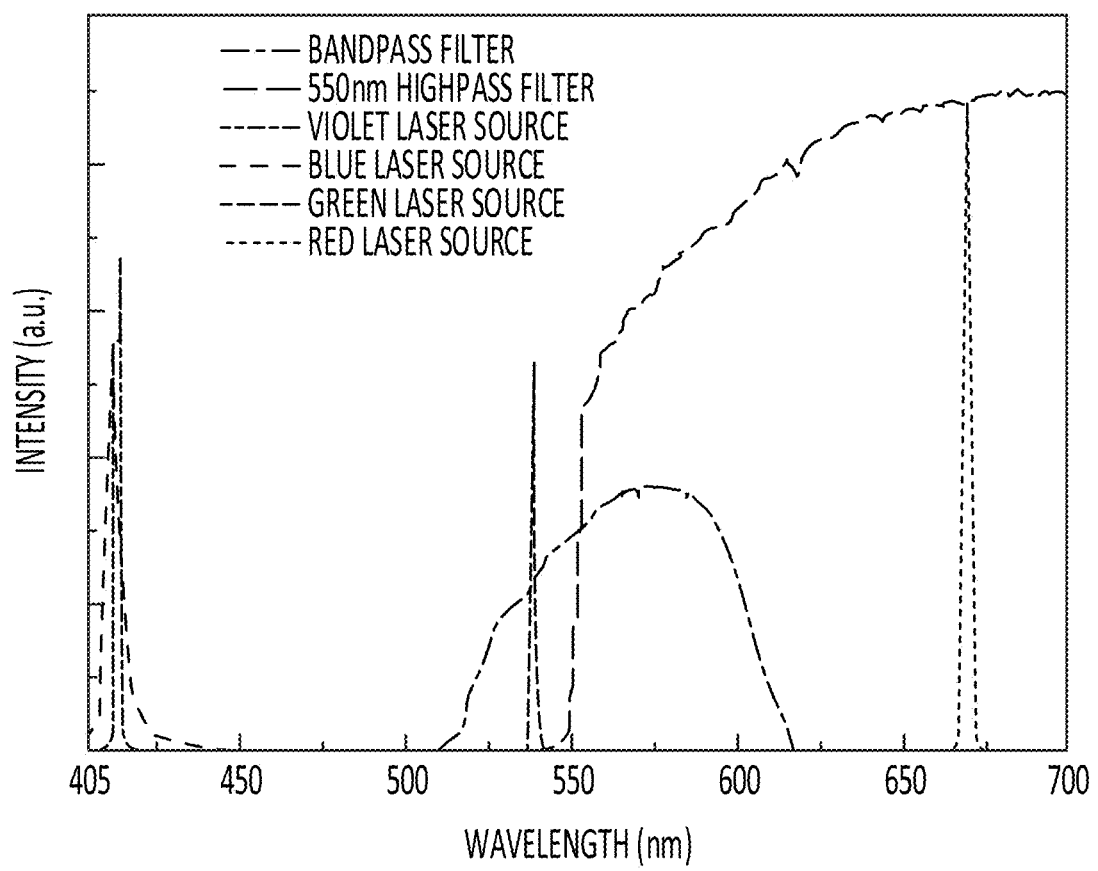
FIG. 7A shows spectra of various laser sources and filtered white light measured with a conventional spectrometer.
Figure 7B:
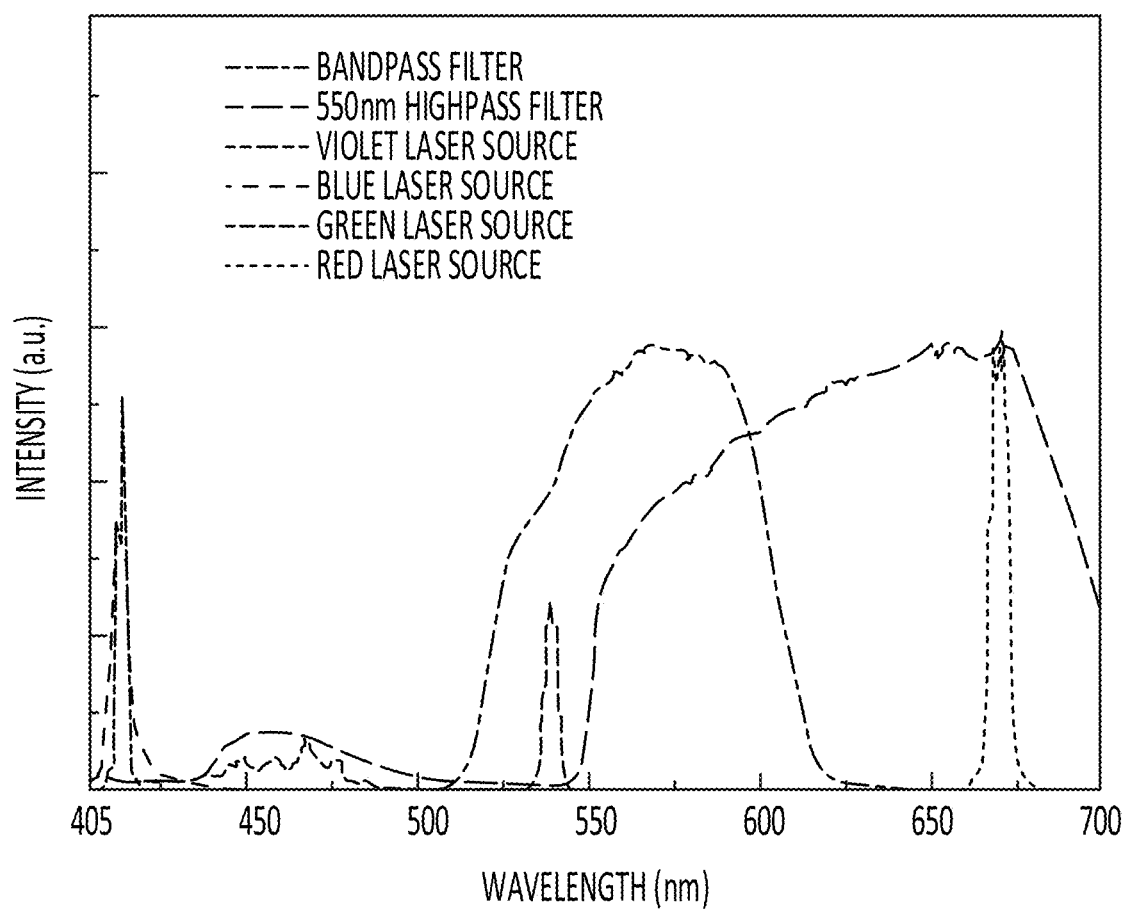
FIG. 7B shows spectra of various laser sources and filtered white light measured with the LVF spectrometer provided by the detection instrument shown in FIGS. 6A and 6B.
Figure 7C:
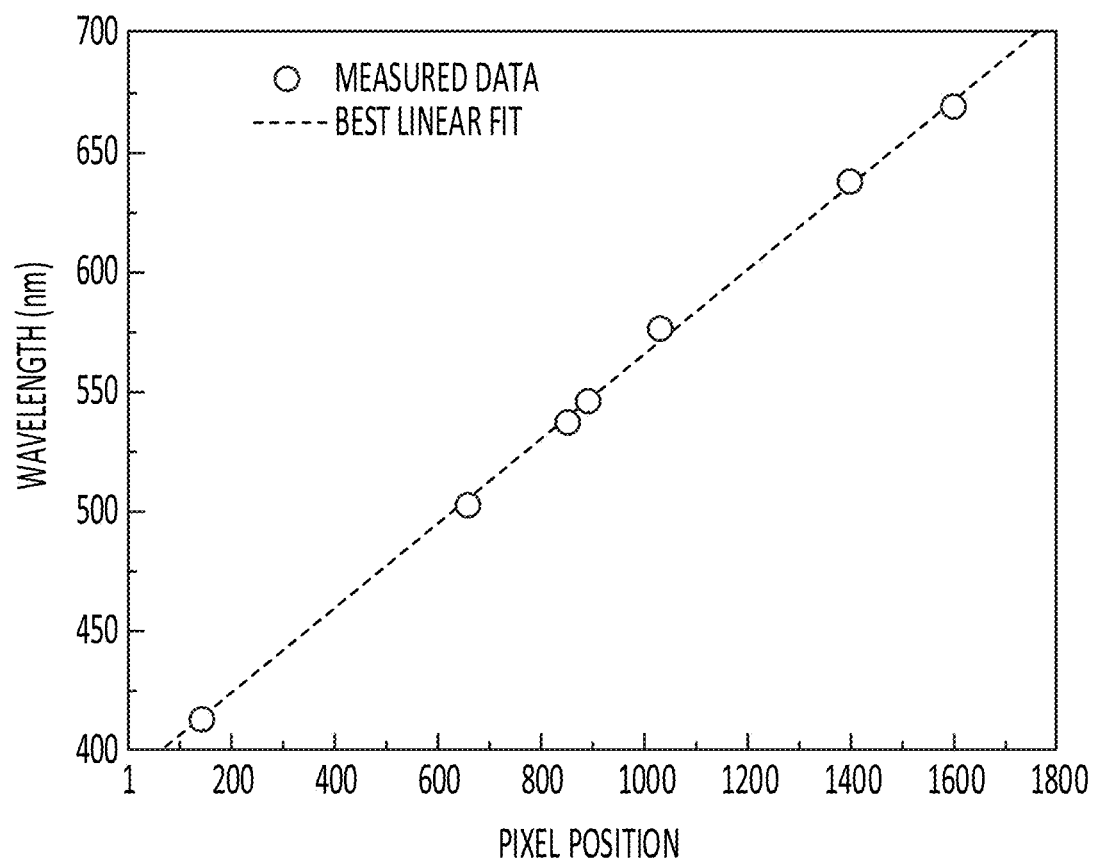
FIG. 7C shows the resulting pixel-to-wavelength conversion for the LVF spectrometer provided by the detection instrument shown in FIGS. 6A and 6B.

A set of laser sources with different emission wavelengths ($\lambda$=410, 413, 538, 669 nm) and an incandescent white light source (Ocean Optics, LS-1, Dunedin, Fla., USA) were used to characterize the spectral sensing capabilities of the LVF spectrometer (i.e., the LVF 108 mounted on the image sensor 104) separately from the LED-based illumination module 102. The incandescent white light source was combined with several optical elements—such as bandpass, high-pass, and low-pass filters (Thorlabs Inc., Newton, N.J., USA)—to produce various illumination spectra within the $\lambda$=400-700 nm range of the LVF 108. The sources were separately measured with a commercially available spectrometer (Ocean Optics, USB2000+ VIS-NIR, Dunedin, Fla., USA) and then compared with the LVF spectrometer. The spectra from the conventional spectrometer are shown in FIG. 7A, and the spectra from the LVF spectrometer are shown in FIG. 7B. This data was used to produce a pixel-to-wavelength conversion table for the LVF spectrometer using the known laser wavelengths. The measured data from the two systems were fitted to Gaussian distributions, and the extracted characteristic pixel position and wavelength values are plotted in FIG. 7C, resulting in a linear correlation between spatial and spectral units. A pixel to wavelength conversion factor of 0.175 nm/pixel was obtained from the calibration.

3. Example Sample Holder

Figure 8A:
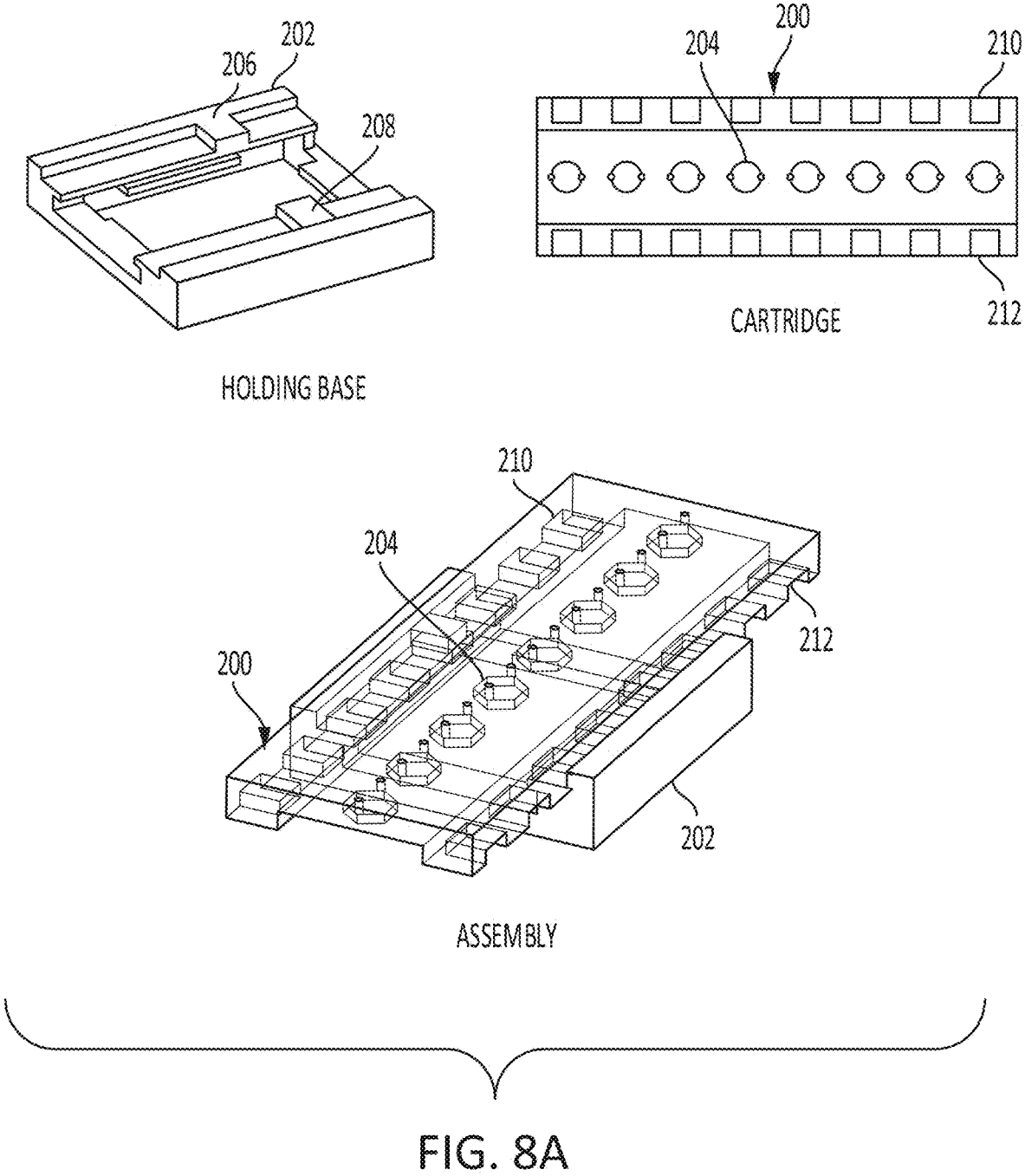
FIG. 8A includes views of a holding base, a sample cartridge, and the holding base and sample cartridge assembles together, in accordance with an example embodiment.

FIGS. 8A and 8B illustrate a sample cartridge 200 that was designed to be used with the detection instrument 100. FIG. 8A shows a top view of the sample cartridge 200, a perspective view of a holding base 202 that was designed to position the sample cartridge 200 over the detection instrument 100, and a view of the sample cartridge 200 and holding base 202 assembled together. The sample cartridge 200 includes eight sample compartments (exemplified by sample compartment 204) designed to hold liquid samples. The holding base 202 is designed to fit over the detection instrument 100 and support the sample cartridge 200 as shown in the assembled position. In the assembled position, the sample cartridge 200 is able to slide in the holding base 202 to position any of the sample compartments in the illumination path of the detection instrument 100 for measurement. In order to accurately position each sample compartment in the illumination path, the holding base 202 includes protrusions 206 and 208 that fit into corresponding alignment notches (exemplified by notches 210 and 212) that are formed on the underside of the sample cartridge 200 on either side of each sample compartment.

FIG. 8B shows a cross-sectional view of the sample cartridge 200 positioned over the detection instrument 100 (the holding base 202 that would hold the sample cartridge 200 in this position is not shown in FIG. 8B). As shown, sample compartment 204 is positioned to receive incident light 220 from the illumination module 102. The sample compartment 204 includes a fluidic channel 222 with an inlet 224 and an outlet 226. A mirror 228 is formed on the upper surface of the fluidic channel 222. With the sample cartridge 200 positioned over the detection instrument 100 as shown in FIG. 8B, the illumination module 102 directs the incident light 220 toward the fluidic channel 222. The width of the fluidic channel 222 approximately matches the width of the beam of incident light 220 (formed by the cylindrical lens 114 collimating the light emitted from the LEDs 110) and the width of the LVF 108. The incident light 220 from the illumination module 102 enters the fluidic channel 222 from below, passes through the liquid sample contained in the fluidic channel 222 to reach the mirror 228. The mirror 228 specularly reflects the incident light 220 as reflected light 230, which then passes through the liquid sample contained in the fluidic channel 222 to reach the LVF 108. In this way, the light used for measurement makes two passes through the liquid sample. In the sample cartridge 200 that was constructed, 100 µL of liquid sample was used in each fluidic channel 222, and the two passes through the liquid sample provided a total liquid path length of 4.72 mm. This liquid path length was found to be useful for measuring absorption spectra of liquid samples.

The sample cartridge 200 and the holding base 202 were stereolithographically printed using Somos® WaterClear Ultra 10122 (DSM, Heerlen, The Netherlands). The mirrors 228 were formed by an adhesive layer coated with aluminum bonded to the upper surface of each fluidic channel 222. A pipette was used to load a liquid sample into each fluidic channel 222 and to subsequently withdraw liquid after a test.

For the ELISA testing, in which a series of eight separate liquid samples were tested, representing a range of analyte concentrations, the eight sample compartments in the sample cartridge 200 were used. The sample cartridge 200 was moved through the holding base 202 sequentially, so that each sample compartment was measured in series. The alignment notches in the sample cartridge 200 positioned each sample compartment in the illumination path for measurement. For measuring the scattering spectra of paper samples, the paper strips were attached onto the back side of the sample cartridge 200.

4. Preparation of the Test Samples

Household food coloring (McCormick, Sparks, Md., USA) was dissolved in water for preliminary testing of colorimetric absorption. A commercially available ELISA kit was purchased (CUSABIO, College Park, Md., USA) for the quantification of human fetal fibronectin (fFN). Lyophilized fFN was reconstituted in the provided standard diluent buffer, and serially diluted to concentrations of 1000, 333, 111, 37, 12, and 4 ng/mL. Standards were pipetted to prepared assay microplate wells with an immobilized antibody specific for fFN. A blank well was filled with only diluent buffer. The standards were prepared in triplicate (n=3). Each microplate well was filled with 100 µL of test liquid, and the assay was completed per manufacturer directions. Upon addition of the stop solution, the plate was read on a commercially available 96-well plate reader (BioTek, Synergy HT, Winooski, Vt., USA) measuring absorbance at a wavelength of 450 nm. Immediately afterward, the liquid samples were individually pipetted into the fluidic channels 222 of the sample cartridge 200. Absorption spectra of the ELISA assay liquids were directly compared with absorption spectra measured with 100 µL deionized water in each channel.

For testing the instrument's ability to measure the scattered spectrum from solid objects, colored Post-It™ notes (3M, St. Paul, Minn., USA) and pH test strips (Hydrion, Brooklyn, N.Y., USA) were measured. Water (pH=7), vinegar (pH=5), diluted HCl (pH=1), and baking soda (pH=8) solutions were used to change the color of the pH test strips.

5. Digital Image Analysis

Post-processing MatLab scripts were written to convert raw images taken by the CMOS image sensor 104 into spectra. First, a region of interest was selected from the captured image along the LVF gradient axis, and then the intensity of the pixels along the transverse direction were averaged to maximize the contribution from a row of 500 pixels representing a single wavelength-related pixel position. The pixel position was then converted into wavelength using a linear approximation based on the LVF spectrometer calibration using the laser calibration sources, as described previously, to obtain the spectrum for each sample. The spectra magnitudes were then corrected by normalizing to the published responsivity of the silicon photodiodes within the CMOS image sensor 104.

6. Colorimetric Dye Measurements

Figure 9A:
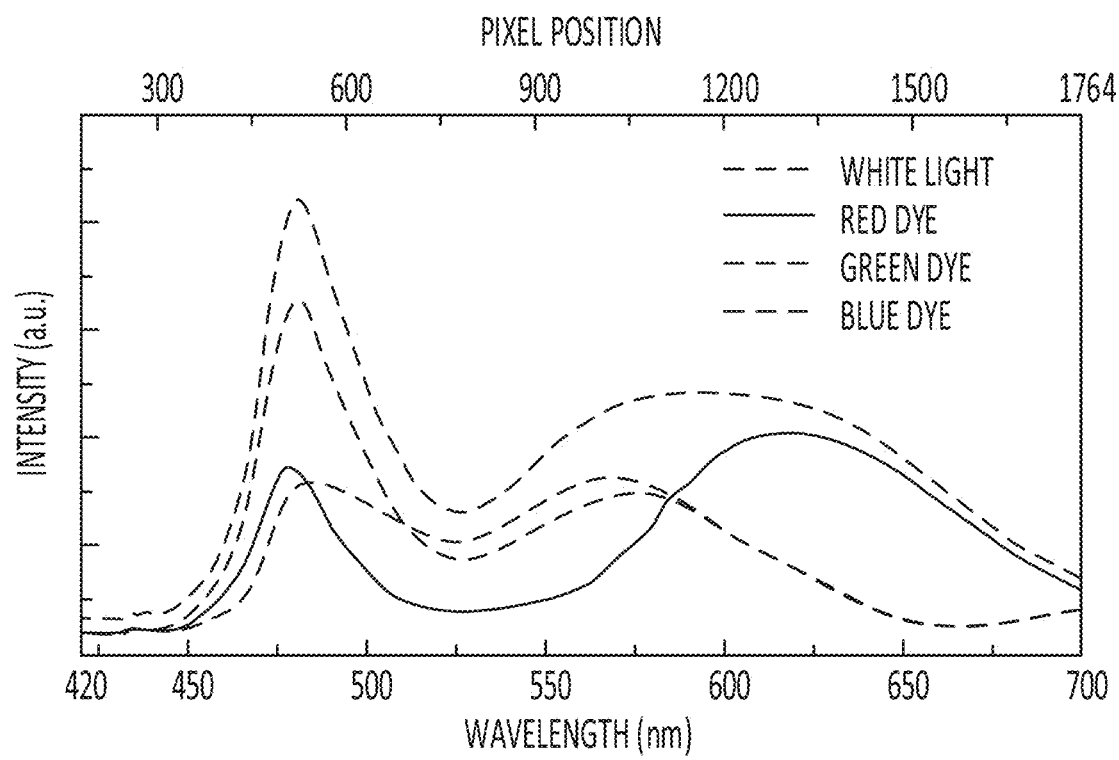
FIG. 9A shows spectra for red, green, and blue dye samples and a white light reference measured using the detection instrument shown in FIGS. 6A and 6B.
Figure 9B:
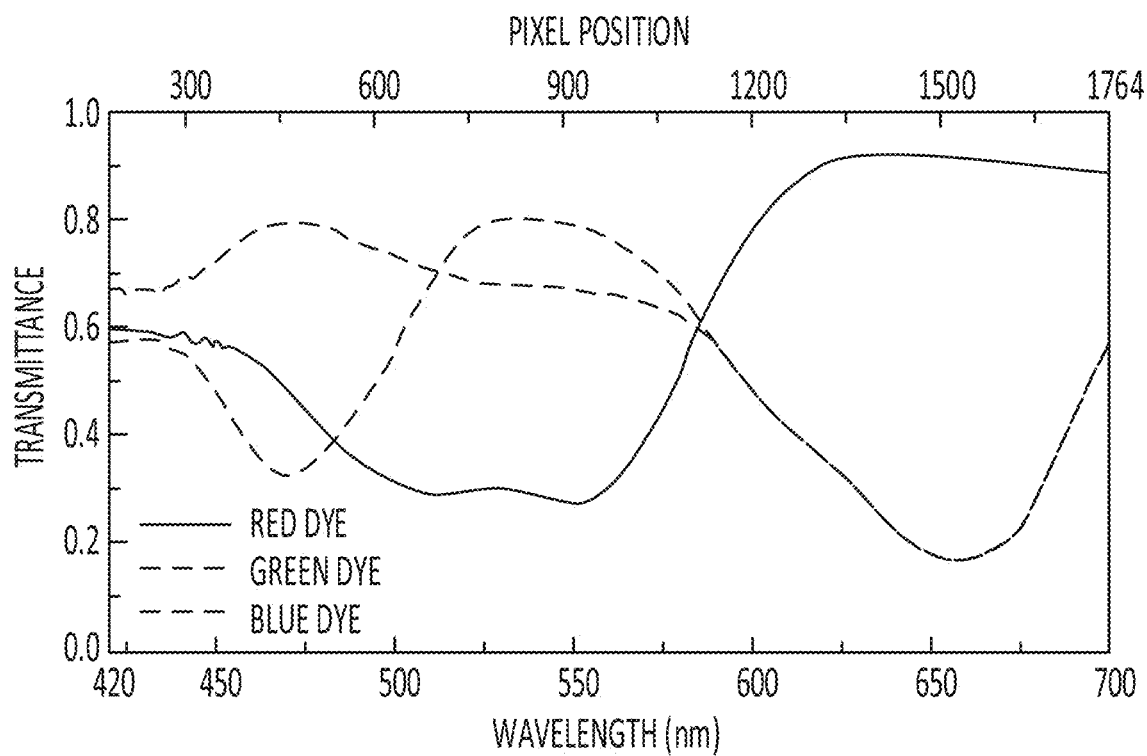
FIG. 9B shows transmittance spectra for the red, green, and blue dye samples of FIG. 9A after normalization by the white light reference.

A series of food dyes (red, green and blue) were dissolved in water and pipetted into the fluidic channels 222 to demonstrate the ability to measure the absorption spectra of liquids within the visible range. Deionized water within one of the fluidic channels 222 was measured as a reference, representing zero absorption, enabling the emission spectra of the white LEDs 110 and any absorption by the materials of the sample cartridge 200 to be mathematically normalized, with the measured intensities obtained for a non-absorptive water sample representing a value of unity at each wavelength. The raw images from the CMOS image sensor 102 for the samples were subsequently converted into spectra plotted in FIG. 9A based on the digital image analysis described previously. The transmittance of each sample, as shown in FIG. 9B, was obtained by calculating the ratio of the sample transmission data and the white light reference.

7. ELISA Test for fFN Assay

Fetal fibronectin is a protein produced by a developing fetus at the interface of the amniotic sac and the uterine lining to provide adhesion between the maternal and fetal tissues. While fetal fibronectin is often detectable in vaginal secretions during the second trimester of pregnancy, detection of fFN in vaginal secretions later during the pregnancy can suggest that delivery in the next 7-10 days may occur. A negative fFN test has a higher predictive value, as it indicates a 95% likelihood that a preterm birth will not occur for at least the next week. Periodic measurements of fFN is regarded as one of the best predictors of preterm birth in all populations studied, and helps identify women at significant risk for preterm birth. This assay was selected as a representative ELISA that utilizes the chromogen 3, 3', 5, 5' trimethylbenzidine (TMB) that has been widely adopted for thousands of similar tests, and as an example application in which a mobile point-of-care test may be useful in regions of the world that lack access to clinical diagnostic facilities.

Figure 10A:
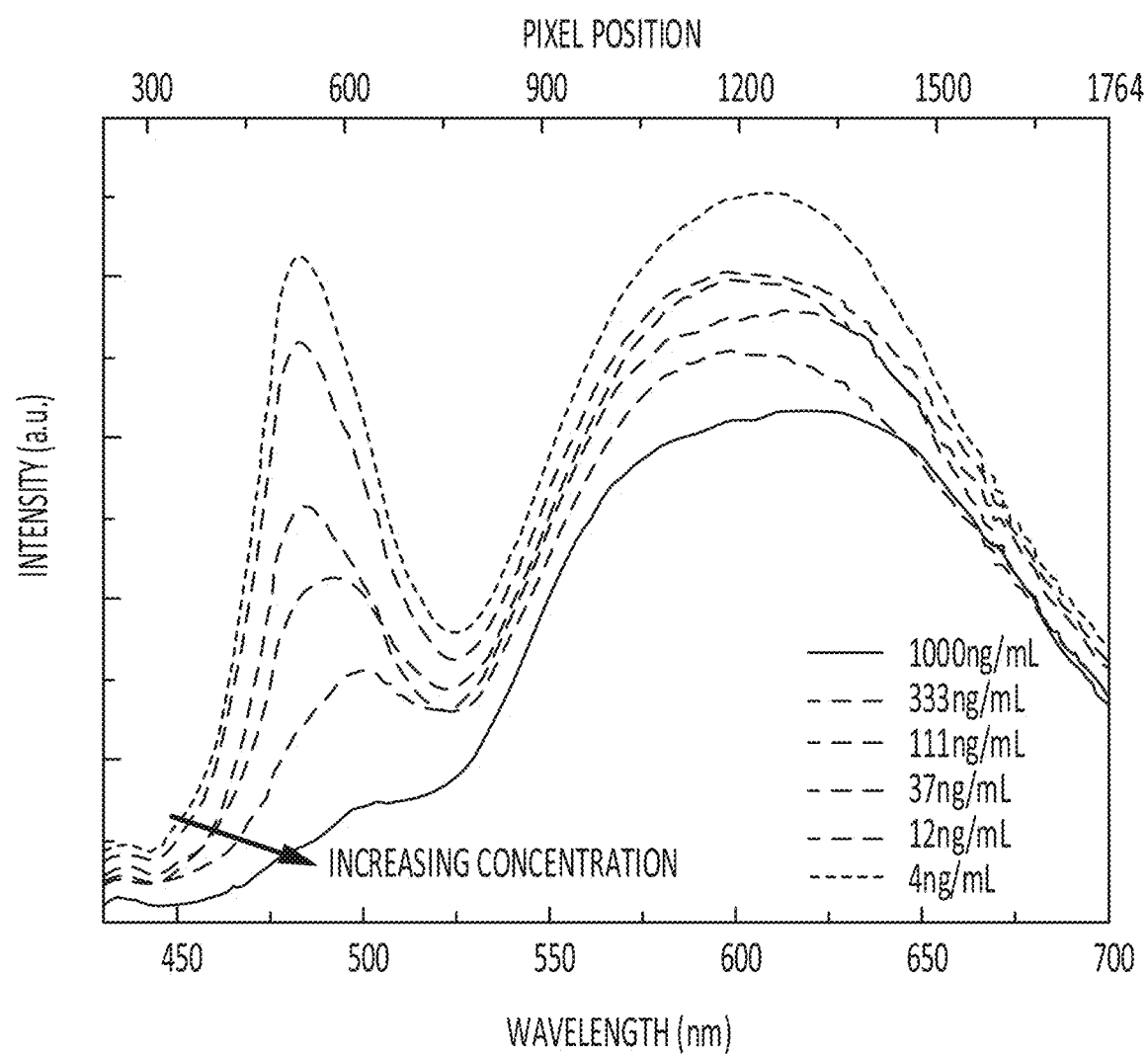
FIG. 10A shows absorption spectra of serially diluted fFN ELISA liquid samples measured using the detection instrument and sample cartridge shown in FIGS. 6A, 6B, 8A, and 8B.
Figure 10B:
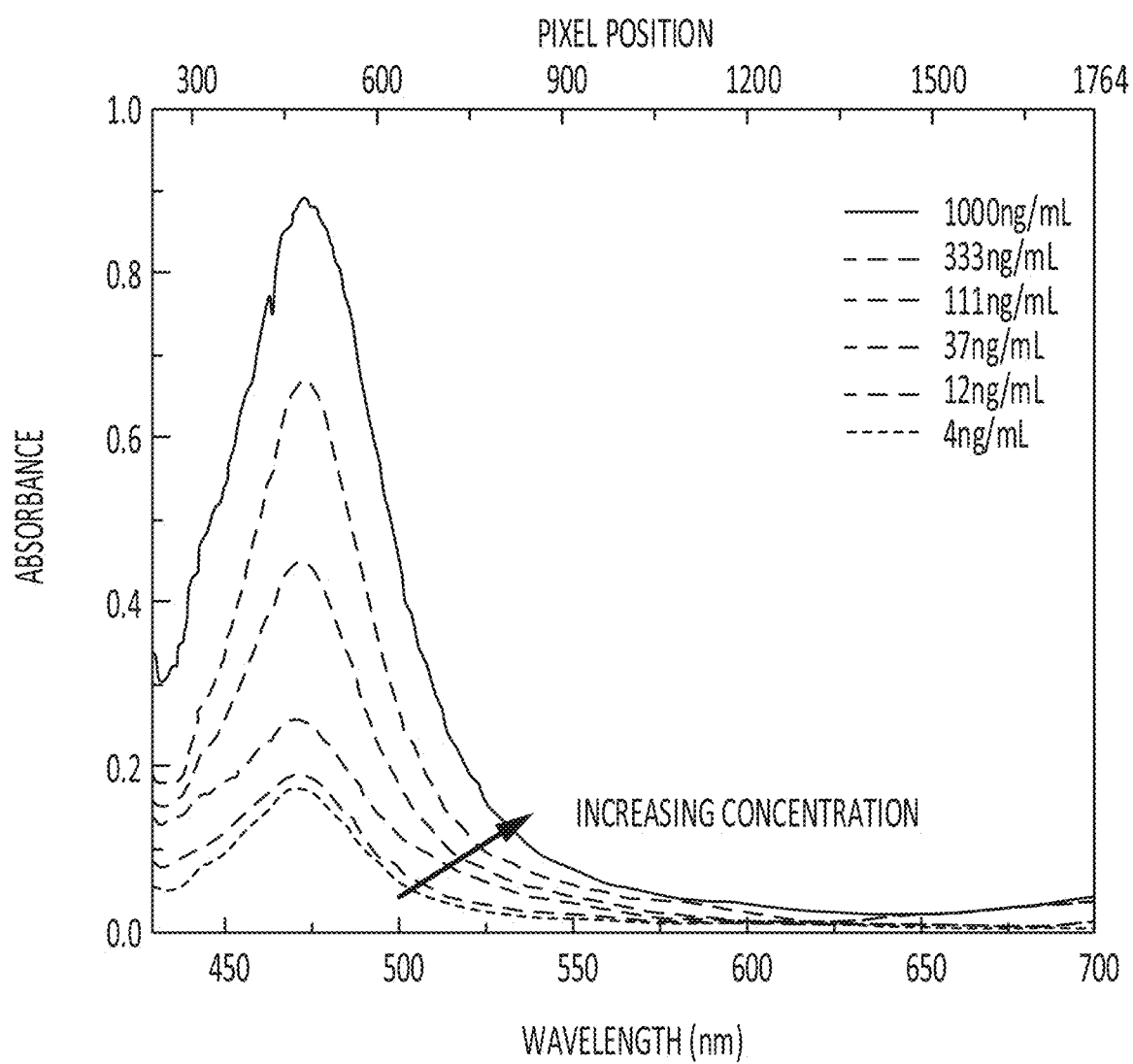
FIG. 10B shows the absorption spectra of FIG. 10A after normalization by the spectrum obtained for a sample compartment filled with water.

A commercially available 96-well kit for a fetal fibronectin analysis was purchased, to utilize the detection instrument 100 in the context of an ELISA assay. Liquid samples were transferred into the fluidic channels 222 of sample cartridge 200 for analysis. The captured images of the samples and the corresponding reference, i.e., deionized water, for each channel were converted into spectra following the image processing protocol described previously. Defined as $A = \log_{10} P_0/P$, where $P_0$ is the original radiant power and P is the transmitted power after sample absorption, the absorbance for each sample can be calculated. FIG. 10A shows the measured absorption spectra for fFN concentrations from 4-1000 ng/ml. It is noted that the spectra feature variation between 600-650 nm in FIG. 10A was introduced by the intrinsic characteristic of each sample compartment, and was accordingly normalized to the spectrum of the same compartment when filled with deionized water, as shown in FIG. 10B. As the full spectral data can be obtained in our system, the absorption was found to be clearly concentration dependent across a wavelength range from 440-550 nm. To generate an ELISA calibration curve, a series of concentrations were tested. The higher the concentration, the stronger the absorbance, and the weaker the illumination received by the CMOS image sensor 104. In order to obtain dynamic range that includes the weakest signal (highest concentration), the intensity of the light emitted by the LEDs 110 was set as high as possible without saturating the lowest concentration. Once the emitted light intensity was selected in this manner (to provide working dynamic range for the entire concentration range of the assay), it remained fixed while all measurements are gathered in less than 30 minutes. Likewise, the integration time of the CMOS image sensor 104 was set to avoid saturation for the lowest ELISA concentration, and then remained fixed for all assay concentrations.

Figure 11A:
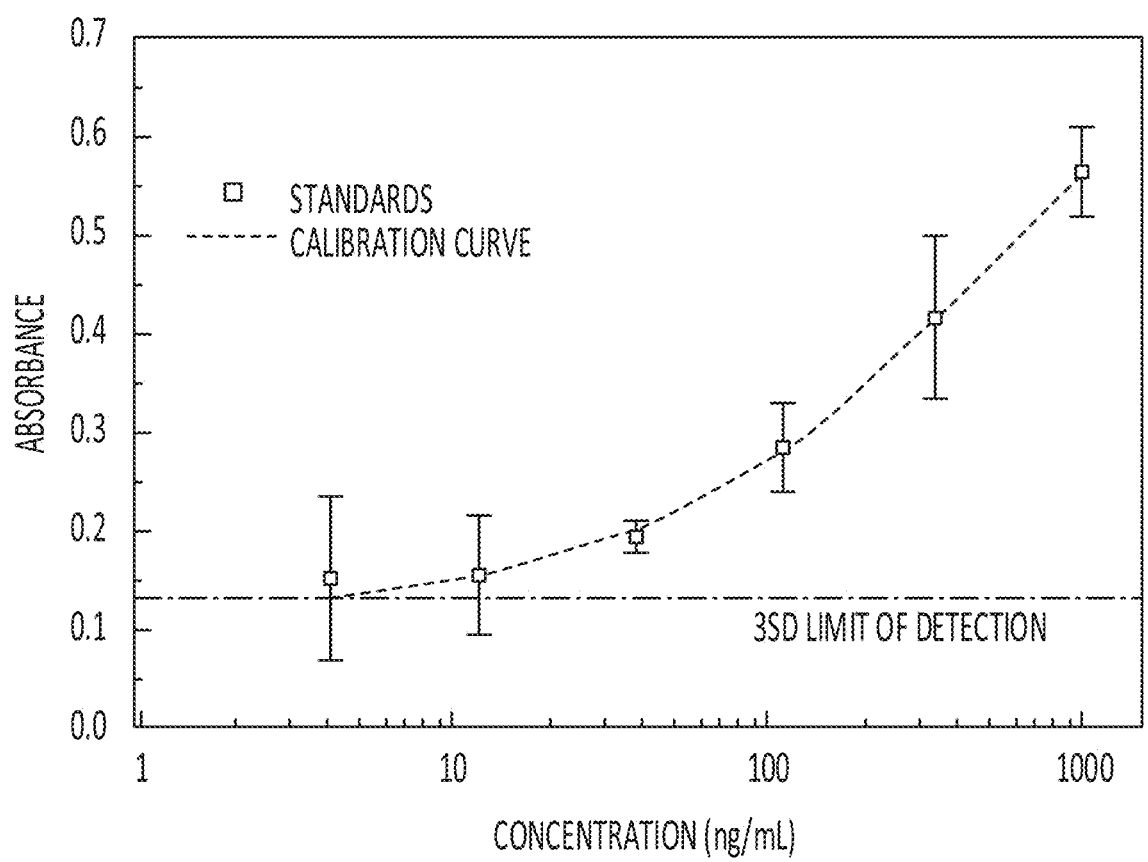
FIG. 11A is a dose-response curve based on the absorbance at 450 nm in the spectra shown in FIG. 10B.
Figure 11B:
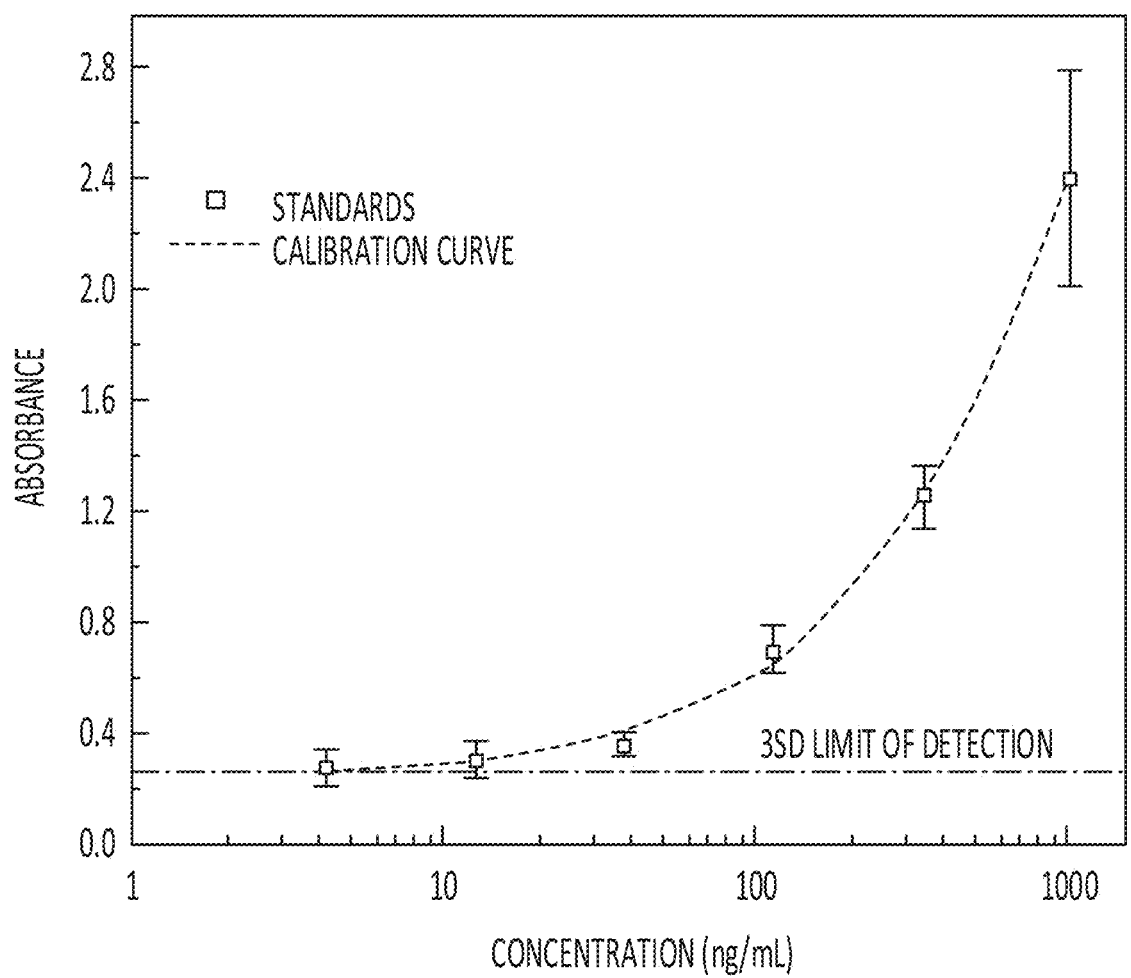
FIG. 11B is a dose-response curve for each concentration of the fFN ELISA assay measured using a microplate reader based on the absorbance at 450 nm.
Figure 11C:
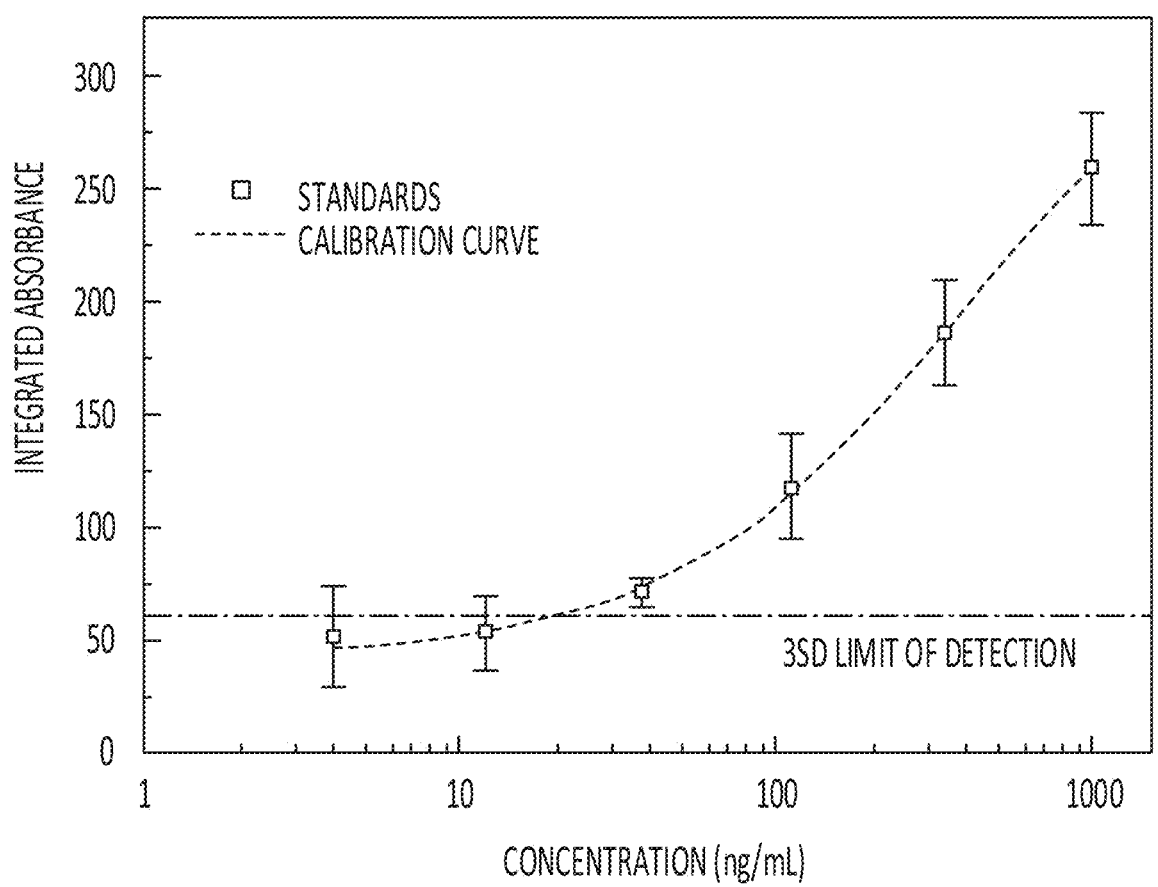
FIG. 11C is a dose-response curve based on the integrated absorbance between 448 nm and 510 nm in the spectra shown in FIG. 10B.

To compare the assay sensitivity of the detection instrument 100 to a commercially available microplate reader, the absorption values at $\lambda = 450$ nm were selected from the spectra. The resulting dose-response curve is shown in FIG. 11A, in comparison with the data measured from the microplate reader, shown in FIG. 11B. By integrating the absorption over a wider wavelength range, from $\lambda = 448-510$ nm, the integrative absorption for each concentration was also calculated and the resulting dose-response curve is plotted in FIG. 11C. The absorption measured using the LVF spectrometer at 450 nm, as well as the integrative absorption through a wavelength range show good agreement with the results from the microplate reader through the entire range of measured concentrations. For each measurement, the dose curve was fit to a four-parameter logistic regression model as suggested by the instruction of the assay. Limits of detection were calculated as three standard deviations above the zero concentration measured average, and have been plotted along with the dose curves in FIGS. 11A-C, which shows that the observed detection limit for the LVF spectrometer (4.52 ng/ml) agrees well with that obtained with the microplate reader (8.46 ng/ml).

8. Colored Paper Test

Figure 12A:
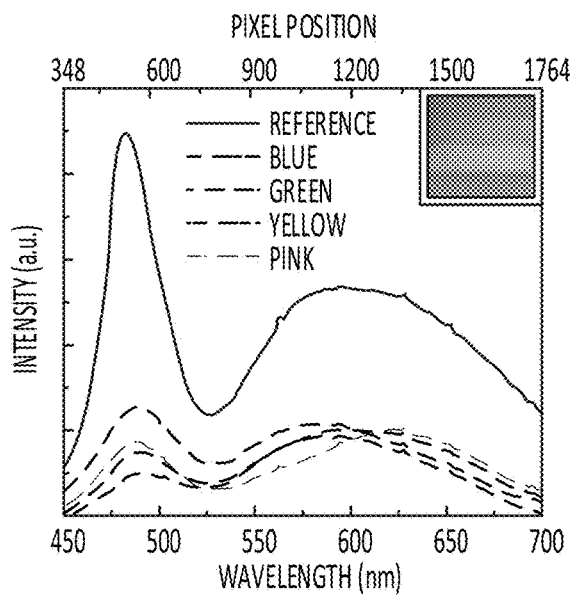
FIG. 12A shows spectra of light scattered from colored paper and a spectrum from an empty sample compartment as a reference measured using the detection instrument and sample cartridge shown in FIGS. 6A, 6B, 8A, and 8B.
Figure 12B:
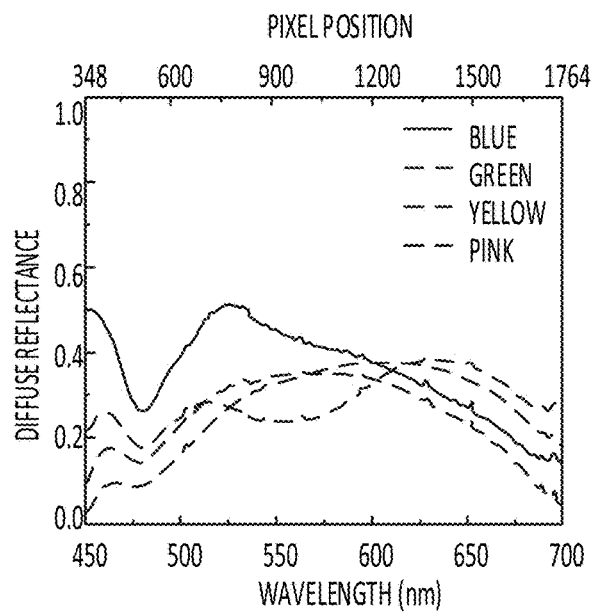
FIG. 12B shows the spectra for the colored paper shown in FIG. 12A normalized by the reference spectrum.
Figure 12C:
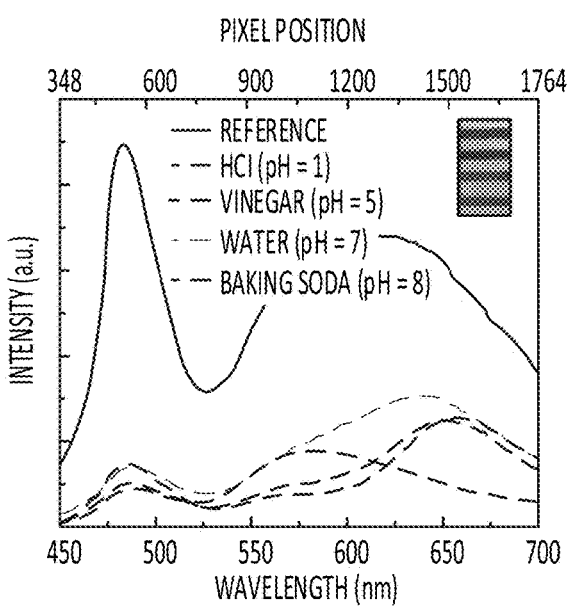
FIG. 12C shows spectra of light scattered from treated pH test strips and a spectrum from an empty sample compartment as a reference measured using the detection instrument and sample cartridge shown in FIGS. 6A, 6B, 8A, and 8B.
Figure 12D:
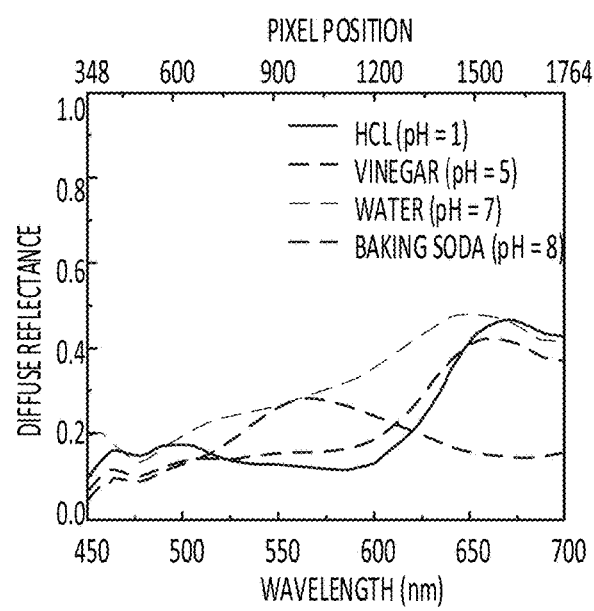
FIG. 12D shows the spectra for the treated pH test strips shown in FIG. 12C normalized by the reference spectrum.

Colored Post-It™ strips (blue, green, yellow, and pink) were attached to the backside of the sample cartridge 200 for illumination, and the scattered light was captured by the LVF spectrometer to demonstrate the ability to discriminate between different colored objects. The captured images were converted into spectra, as shown in FIG. 12A. These spectra were normalized against the spectrum obtained from an empty sample compartment used as a reference (i.e., light reflected by the mirror in the empty sample compartment), to produce the plots shown in FIG. 12B. Finally, pH test strips were used for the paper test. Water, vinegar, diluted HCl and baking soda solutions with different pH values were used to change the color of the test strips. The spectra obtained from the images captured by the LVF spectrometer are plotted in FIG. 12C. These are also normalized against the spectrum of an empty sample compartment as a reference and shown in FIG. 12D. The spectra are clearly differentiated from each other, and indicate scattering spectra that quantitatively represent the color that is visually observed. Note that the scattered spectra from test strips and colored paper are somewhat complex, containing components from across the spectra, and that spectroscopic analysis gathers more complete information than what is obtainable by only observing the intensity of RGB pixels.

9. Conclusion

A compact standalone spectroscopic unit integrated onto a CMOS image sensor with a set of white light LEDs and an LVF sensitive over the visible spectrum is provided for both liquid absorption spectrum and solid diffuse reflectance analysis. The components used in this integrated platform are similar to those already used in mobile communication devices such as smartphones and tablets, highlighting the potential for further integration of the spectroscopic unit directly into such devices. Compared to other non-spectral analyzing colorimetric methods, such as visual inspection and non-spectral image analysis, the spectroscopic analysis system described herein provides quantitative spectral information equivalent to that obtained from conventional spectrometers for analytes with broad spectral features. A representative point-of-care diagnostic ELISA test was conducted and the results were compared to those obtained from a commercially available ELISA microplate reader, showing excellent agreement for dose-response analysis and limits of detection. The diffuse reflectance spectra of colored Post-it® and pH test paper strips were also demonstrated, representing the ability to quantitatively measure the scattered spectra from colored test strips used for many point-of-care tests. The versatility of the system coupled with its compactness makes it suitable for a broad class of applications in color change measurement for both liquid and solid phase samples, and is sufficiently low-profile, simple, and low cost for integration within future mobile communication devices that seek to differentiate themselves by the availability of "science camera" functions. Not only would such a capability be amusing and interesting for measurement of colored objects encountered in everyday life, but would enable truly accurate analytical capability for enabling a host of point-of-use medical diagnostic, environmental monitoring, and food safety applications

What is claimed is:

1. A system, comprising:
    a light source, wherein the light source comprises a plurality of light-emitting diodes (LEDs) optically coupled to a cylindrical lens, wherein the cylindrical lens has a diameter and a long axis perpendicular to the diameter, and wherein the LEDs are arranged in a line parallel to the long axis of the cylindrical lens;
    a smartphone comprising an image sensor;
    a linear variable filter (LVF), wherein the LVF is optically coupled to the image sensor of the smartphone; and
    a sample holder comprising a planar surface, wherein the planar surface defines a surface normal that extends perpendicularly from the planar surface and goes through a point between the light source and the LVF, wherein the light source is arranged to direct incident light toward the planar surface such that the incident light is at a first acute angle relative to the surface normal, and wherein the LVF is arranged to (i) receive analysis light, wherein the analysis light comprises light propagating from the planar surface at a second acute angle relative to the surface normal and (ii) filter the received analysis light such that different wavelength components of the received analysis light are transmitted toward different portions of the image sensor.

2. The system of claim 1, wherein the analysis light comprises incident light from the light source that has reflected from the planar surface, and wherein the second acute angle is equal to the first acute angle.

3. The system of claim 2, wherein the planar surface comprises a mirror.

4. The system of claim 3, wherein the sample holder further comprises a sample compartment that contains a liquid sample, wherein the analysis light comprises incident light from the light source that has interacted with the liquid sample contained in the sample compartment.

5. The system of claim 4, wherein the sample compartment is optically coupled to the mirror such that the incident light from the light source passes through a first portion of the liquid sample contained in the sample compartment, is reflected by the mirror, passes through a second portion of the liquid sample contained in the sample compartment, and is received by the LVF as analysis light.

6. The system of claim 5, wherein the sample holder comprises a plurality of sample compartments and a plurality of mirrors, wherein each sample compartment of the plurality of sample compartments is optically coupled to a respective mirror of the plurality of mirrors.

7. The system of claim 6, wherein the sample holder is moveable relative to the light source and LVF such that the incident light from the light source can be directed into any of the sample compartments to provide analysis light received by the LVF.

8. The system of claim 1, wherein the analysis light comprises incident light from the light source that has scattered from the planar surface.

9. The system of claim 8, wherein the planar surface comprises a test area of a test strip, wherein the analysis light comprises incident light from the light source that has interacted with a sample applied to the test area.

10. The system of claim 1, wherein the LVF is bonded directly to the image sensor.

11. The system of claim 1, further comprising a plurality of LVFs optically coupled to the image sensor, wherein each LVF in the plurality of LVFs filters a different respective range of wavelengths.

12. The system of claim 1, wherein the light source, the LVF, and the image sensor are integrated within the smartphone.

13. A method, comprising:
    directing incident light from a light source toward a planar surface of a sample holder such that (i) the incident light is at a first acute angle relative to a surface normal of the planar surface and (ii) the incident light interacts with a sample disposed in the sample holder, wherein the light source comprises a plurality of light-emitting diodes (LEDs) optically coupled to a cylindrical lens, wherein the cylindrical lens has a diameter and a long axis perpendicular to the diameter, and wherein the LEDs are arranged in a line parallel to the long axis of the cylindrical lens;
    receiving analysis light at a linear variable filter (LVF) optically coupled to an image sensor of a smartphone, wherein the analysis light comprises light propagating from the planar surface at a second acute angle relative to the surface normal; and
    filtering, by the LVF, the received analysis light such that different wavelength components of the received analysis light are transmitted toward different portions of the image sensor.

14. The method of claim 13, further comprising:
using the image sensor to capture at least one image, wherein the different wavelength components of the received analysis light are in different pixels of the at least one image.

15. The method of claim 13, wherein the analysis light comprises incident light from the light source that has reflected from the planar surface, and wherein the second acute angle is equal to the first acute angle.

16. The method of claim 15, wherein the sample is a liquid sample contained in a sample compartment of the sample holder, and wherein the planar surface comprises a mirror that is optically coupled to the sample compartment.

17. The method of claim 16, wherein directing incident light from the light source toward the planar surface of the sample holder comprises directing the incident light toward the mirror such that the incident light passes through a first portion of the liquid sample contained in the sample compartment, is reflected by the mirror, passes through a second portion of the liquid sample contained in the sample compartment, and is received by the LVF as analysis light.

18. The method of claim 13, wherein the analysis light comprises incident light from the light source that has scattered from the planar surface.

19. The method of claim 18, wherein the planar surface comprises a test area of a test strip, and wherein the sample is applied to the test area.

* * * * *